(12) United States Patent
Ito

(10) Patent No.: US 10,979,861 B2
(45) Date of Patent: Apr. 13, 2021

(54) INFORMATION TRANSMISSION SYSTEM

(71) Applicant: MICWARE CO., LTD., Kobe (JP)

(72) Inventor: Makoto Ito, Kobe (JP)

(73) Assignee: MICWARE CO., LTD., Kobe (JP)

( * ) Notice: Subject to any disclaimer, the term of this patent is extended or adjusted under 35 U.S.C. 154(b) by 12 days.

(21) Appl. No.: 16/721,865

(22) Filed: Dec. 19, 2019

(65) Prior Publication Data

US 2020/0213810 A1   Jul. 2, 2020

(30) Foreign Application Priority Data

Dec. 27, 2018 (JP) .............................. JP2018-245710
Dec. 27, 2018 (JP) .............................. JP2018-245711
Dec. 27, 2018 (JP) .............................. JP2018-245712

(51) Int. Cl.
  *H04W 4/00* (2018.01)
  *H04W 4/029* (2018.01)
  (Continued)

(52) U.S. Cl.
  CPC ........... *H04W 4/029* (2018.02); *H04W 4/021* (2013.01); *H04W 4/40* (2018.02); *H04W 4/80* (2018.02); *G01C 22/00* (2013.01)

(58) Field of Classification Search
  CPC ....... H04W 4/029; H04W 4/021; H04W 4/80; H04W 4/40; G01C 22/00
  (Continued)

(56) References Cited

U.S. PATENT DOCUMENTS 6,408,232 B1 * 6/2002 Cannon ................. G08G 1/017
                                                        123/493
6,711,495 B1 * 3/2004 Ukai ..................... G01S 5/0027
                                                        340/436
(Continued)

FOREIGN PATENT DOCUMENTS

JP     2006-065391 A     3/2006
JP     2006-287705 A    10/2006
(Continued)

OTHER PUBLICATIONS

English Translations of Office Action dated Dec. 1, 2020 for corresponding Japanese Patent Application No. 2018-245710.
(Continued)

*Primary Examiner* — Marceau Milord
(74) *Attorney, Agent, or Firm* — Foley & Lardner LLP

(57) ABSTRACT

An information transmission system includes a communication connection device and a server. The communication connection device includes a use determination unit, a first communicator, a second communicator, and a communication control unit. The use determination unit determines whether a movable object is in use. The second communicator communicates with the server for a larger volume of data than the first communicator at a time, or communicates with the server more frequently than the first communicator. The communication control unit causes the second communicator to transmit, selectively from transmission information, specific transmission information including predefined movable object information to the server when the use determination unit determines that the movable object is not in use and the second communicator is enabled to communicate with a communication base station.

14 Claims, 19 Drawing Sheets

(51) Int. Cl.
  H04W 4/021 (2018.01)
  H04W 4/80 (2018.01)
  H04W 4/40 (2018.01)
  G01C 22/00 (2006.01)

(58) Field of Classification Search
  USPC .......................................................... 370/329
  See application file for complete search history.

(56) References Cited

U.S. PATENT DOCUMENTS

| | | | |
|---|---|---|---|
| 7,737,829 B2* | 6/2010 | Nishyama | B60L 53/65 340/425.5 |
| 8,321,081 B2* | 11/2012 | Nakamura | B60L 53/305 701/22 |
| 8,564,403 B2* | 10/2013 | Landau-Holdsworth | B60L 53/67 340/5.8 |
| 2008/0055058 A1 | 3/2008 | Nishiyama | |
| 2015/0141008 A1* | 5/2015 | Ishikawa | H04W 48/16 455/434 |
| 2016/0029243 A1 | 1/2016 | Seino | |
| 2018/0137698 A1 | 5/2018 | Yasuda | |
| 2018/0165829 A1* | 6/2018 | Hong | G06T 7/70 |
| 2019/0277880 A1* | 9/2019 | Kinoshita | G01C 21/165 |
| 2020/0051323 A1* | 2/2020 | Araki | G06T 15/205 |

FOREIGN PATENT DOCUMENTS

| | | |
|---|---|---|
| JP | 2014-022838 A | 2/2014 |
| JP | 2016-025505 A | 2/2016 |
| JP | 2016-061285 A | 4/2016 |
| JP | 2016-207006 A | 12/2016 |
| JP | 6238500 B1 | 11/2017 |
| JP | 2018-119932 A | 8/2018 |
| JP | 2018-170699 A | 11/2018 |

OTHER PUBLICATIONS

English Translations of Office Action dated Dec. 1, 2020 for corresponding Japanese Patent Application No. 2018-245711.
English translations to the Office Action dated Nov. 17, 2020 for corresponding Japanese Patent Application No. 2018-245712.

* cited by examiner

INFORMATION TRANSMISSION SYSTEM

FIELD OF INVENTION

The present invention relates to an information transmission system, and more particularly, to an information transmission system for transmitting information from a communication connection device mounted on a movable object to a server.

BACKGROUND ART

In recent years, various communication devices complying with different communication standards have been developed and used for transmitting data. For example, low-power wide-area (LPWA) communication is increasingly used as low-cost, low-power-consumption communication across a wide area.

Although LPWA communication enables low-cost and low-power-consumption data transmission, LPWA communication can transmit a small volume of data at a time. Patent Literature 1 describes a remote monitoring system that performs, in addition to LPWA communication, 3G mobile communication or long term evolution (LTE) mobile communication to supplement LPWA communication. The remote monitoring system includes a server and monitoring apparatuses. The monitoring apparatus has the function of storing monitor images captured by a camera. The monitoring apparatus normally uses LPWA communication to communicate with the server to reduce the communication cost, and uses 3G mobile or LTE mobile communication enabling transmission of a large volume of data when transmitting monitor images to the server.

CITATION LIST

Patent Literature

Patent Literature 1: Japanese Patent No. 6238500

A technique is to be developed for collecting information about movable objects including automobiles, motorcycles, and ships at a server at predetermined time intervals while minimizing the cost. The collected movable object information may be used for maintaining the movable object or managing client information about a user of the movable object.

In an environment allowing mobile communication, each movable object incorporates a mobile communication module to transmit movable object information to the server substantially without any limitation on the transmission data volume, the timing of transmission, and the number of times of transmission per day.

However, to use a mobile communication network, a movable object incorporates an expensive mobile communication module with high communication fees. Also, movable object information cannot be transmitted with high accuracy to the server at places unreachable by mobile communication radio waves, such as in rural areas, mountainous areas, deserts, or offshore areas.

One or more aspects of the present invention are directed to an information transmission system for collecting movable object information at a server with high accuracy.

SUMMARY OF INVENTION

An information transmission system according to a first aspect of the present disclosure includes a communication connection device and a server. The communication connection device is mounted on a movable object. The server performs information transmission with the communication connection device. The communication connection device includes an information obtaining unit, a use determination unit, a first communicator, a second communicator, and a communication control unit. The information obtaining unit obtains movable object information about the movable object. The use determination unit determines whether the movable object is in use. The first communicator communicates with the server. The second communicator communicates with the server via a communication base station through short-range wireless communication. The communication control unit controls the first communicator and the second communicator. The first communicator transmits transmission information including movable object information to the server. The second communicator transmits the transmission information including the movable object information to the server via the communication base station. The second communicator communicates with the server for a larger volume of data than the first communicator at a time, or communicates with the server more frequently than the first communicator. When the use determination unit determines that the movable object is not in use, and the second communicator is enabled to communicate with the communication base station, the communication control unit causes the second communicator to transmit, selectively from the transmission information, specific transmission information including predefined movable object information to the server. The communication control unit causes the first communicator or the second communicator to transmit, selectively from the transmission information, transmission information different from the specific transmission information to the server.

An information transmission system according to a second aspect of the present disclosure is the information transmission system according to the first aspect in which the movable object information obtained by the information obtaining unit includes position information about the movable object. The communication control unit causes the second communicator to transmit, selectively from the transmission information, the specific transmission information to the server when the use determination unit determines that the movable object is not in use while the movable object is at a predetermined position and when the second communicator is enabled to communicate with the communication base station.

An information transmission system according to a third aspect of the present disclosure is the information transmission system according to the first or second aspect in which the communication control unit receives movable-object-dedicated information used in the movable object from the server through the second communicator when the use determination unit determines that the movable object is not in use and when the second communicator is enabled to communicate with the communication base station.

An information transmission system according to a fourth aspect of the present disclosure is the information transmission system according to any one of the first to third aspects in which the communication control unit causes the first communicator to transmit the transmission information different from the specific transmission information to the server when the second communicator is disabled to communicate with the communication base station. The communication control unit causes the second communicator to transmit the transmission information different from the specific transmission information to the server when the second communicator is enabled to communicate with the communication base station.

An information transmission system according to a fifth aspect of the present disclosure is the information transmission system according to any one of the first to fourth aspects further including a stop duration obtaining unit. The stop duration obtaining unit obtains a stop duration for the movable object. The use determination unit determines that the movable object is not in use when the stop duration has reached a predetermined duration.

An information transmission system according to a sixth aspect of the present disclosure is the information transmission system according to the fifth aspect in which the stop duration obtaining unit obtains a duration for which an ignition power source of the movable object is off as a stop duration for the movable object. The use determination unit determines that the movable object is not in use when the duration for which the ignition power source is off has reached the predetermined duration.

An information transmission system according to a seventh aspect of the present disclosure is the information transmission system according to any one of the first to fifth aspects in which the use determination unit determines that the movable object is not in use when an ignition power source is off and an accessory power source is on.

A communication connection device according to an eighth aspect of the present disclosure is mountable on a movable object. The communication connection device includes an information obtaining unit, a use determination unit, a first communicator, a second communicator, and a communication control unit. The information obtaining unit obtains movable object information about the movable object. The use determination unit determines whether the movable object is in use. The first communicator communicates with a server. The second communicator communicates with the server via a communication base station through short-range wireless communication. The communication control unit controls the first communicator and the second communicator. The first communicator transmits transmission information including the movable object information to the server. The second communicator transmits the transmission information including the movable object information to the server via the communication base station. The second communicator communicates with the server for a larger volume of data than the first communicator at a time, or communicates with the server more frequently than the first communicator. The communication control unit causes the second communicator to transmit, selectively from the transmission information, specific transmission information including predefined movable object information to the server when the use determination unit determines that the movable object is not in use and when the second communicator is enabled to communicate with the communication base station. The communication control unit causes the first communicator or the second communicator to transmit, selectively from the transmission information, transmission information different from the specific transmission information to the server.

An information transmission method according to a ninth aspect of the present disclosure is a method for a communication connection device mountable on a movable object to transmit information to a server. The communication connection device includes a first communicator and a second communicator. The first communicator communicates with the server. The second communicator communicates with the server via a communication base station through short-range wireless communication. The first communicator transmits transmission information including movable object information to the server. The second communicator transmits the transmission information including the movable object information to the server via the communication base station. The second communicator communicates with the server for a larger volume of data than the first communicator at a time, or communicates with the server more frequently than the first communicator. The information transmission method according to a ninth aspect of the present disclosure includes obtaining, with the communication connection device, movable object information about the movable object, determining, with the communication connection device, whether the movable object is in use, transmitting, selectively from transmission information including the movable object information, specific transmission information including predefined movable object information from the second communicator to the server when the communication connection device determines that the movable object is not in use and when the second communicator is enabled to communicate with the communication base station, and transmitting, selectively from the transmission information, transmission information different from the specific transmission information from the first communicator or the second communicator to the server.

A non-transitory computer-readable storage medium according to a tenth aspect of the present disclosure stores a program for causing a computer to function as an information obtaining unit, a use determination unit, and a communication control unit. The information obtaining unit obtains movable object information about a movable object. The use determination unit determines whether the movable object is in use. The communication control unit controls a first communicator and a second communicator. The first communicator communicates with a server. The second communicator communicates with the server via a communication base station through short-range wireless communication. The first communicator transmits transmission information including the movable object information to the server. The second communicator transmits the transmission information including the movable object information to the server via the communication base station. The second communicator communicates with the server for a larger volume of data than the first communicator at a time, or communicates with the server more frequently than the first communicator. The communication control unit causes the second communicator to transmit, selectively from the transmission information, specific transmission information including predefined movable object information to the server when the use determination unit determines that the movable object is not in use and when the second communicator is enabled to communicate with the communication base station. The communication control unit causes the first communicator or the second communicator to transmit, selectively from the transmission information, transmission information different from the specific transmission information to the server.

An information transmission system according to an eleventh aspect of the present disclosure includes a communication connection device and a server. The communication connection device is mounted on a movable object. The server performs information transmission with the communication connection device. The communication connection device includes an information obtaining unit, a first communicator, a second communicator, and a communication control unit. The information obtaining unit obtains movable object information about the movable object. The first communicator communicates with the server. The second communicator communicates with the server via a communication base station through short-range wireless communication. The communication control unit controls the first communicator and the second communicator. The first communicator transmits transmission information including movable object information to the server. The second communicator transmits the transmission information including the movable object information to the server via the communication base station. The second communicator communicates with the server for a larger volume of data than the first communicator at a time, or communicates with the server more frequently than the first communicator. The communication control unit causes the second communicator to transmit, selectively from the transmission information, specific transmission information including predefined movable object information to the server when the second communicator is enabled to communicate with the communication base station and when the first communicator has received an upload start instruction. The communication control unit causes the first communicator or the second communicator to transmit, selectively from the transmission information, transmission information different from the specific transmission information to the server.

An information transmission system according to a twelfth aspect of the present disclosure is the information transmission system according to the eleventh aspect in which the server includes a first server communication unit, a server input unit, and a server control unit. The first server communication unit communicates with the first communicator. The server input unit receives a predetermined operation. The server control unit causes the first server communication unit to transmit the upload start instruction to the first communicator when the server input unit receives the predetermined operation.

An information transmission system according to a thirteenth aspect of the present disclosure is the information transmission system according to the twelfth aspect in which the movable object information includes position information about the movable object. The server includes a server display unit. The server control unit causes the server display unit to display a schematic diagram of a predetermined area in which the movable object is movable, a movable object mark indicating a position of the movable object in the schematic diagram, and a communication base station mark indicating a position of the communication base station in the schematic diagram. The server control unit causes the movable object mark in the schematic diagram to be displayed based on the position information received from the movable object.

A communication connection device according to a fourteenth aspect of the present disclosure is mountable on a movable object. The communication connection device includes an information obtaining unit, a first communicator, a second communicator, and a communication control unit. The information obtaining unit obtains movable object information about the movable object. The first communicator communicates with a server. The second communicator communicates with the server via a communication base station through short-range wireless communication. The communication control unit controls the first communicator and the second communicator. The first communicator transmits transmission information including movable object information to the server. The second communicator transmits the transmission information including the movable object information to the server via the communication base station. The second communicator communicates with the server for a larger volume of data than the first communicator at a time, or communicates with the server more frequently than the first communicator. The communication control unit causes the second communicator to transmit, selectively from the transmission information, specific transmission information including predefined movable object information to the server when the second communicator is enabled to communicate with the communication base station and when the first communicator has received an upload start instruction. The communication control unit causes the first communicator or the second communicator to transmit, selectively from the transmission information, transmission information different from the specific transmission information to the server.

An information transmission method according to a fifteenth aspect of the present disclosure is a method for a communication connection device mountable on a movable object to transmit information to a server. The communication connection device includes a first communicator and a second communicator. The first communicator communicates with the server. The second communicator communicates with the server via a communication base station through short-range wireless communication. The second communicator communicates with the server for a larger volume of data than the first communicator at a time, or communicates with the server more frequently than the first communicator. The information transmission method according to the fifteenth aspect includes obtaining, with the communication connection device, movable object information about the movable object, transmitting, selectively from transmission information including the movable object information, specific transmission information including predefined movable object information from the second communicator to the server when the second communicator is enabled to communicate with the communication base station and when the first communicator has received an upload start instruction, and transmitting, selectively from the transmission information, transmission information different from the specific transmission information from the first communicator or the second communicator to the server.

A non-transitory computer-readable storage medium according to a sixteenth aspect of the present disclosure stores a program for causing a computer to function as an information obtaining unit and a communication control unit. The information obtaining unit obtains movable object information about a movable object. The communication control unit controls a first communicator and a second communicator. The first communicator communicates with a server. The second communicator communicates with the server via a communication base station through short-range wireless communication. The first communicator transmits transmission information including the movable object information to the server. The second communicator transmits the transmission information including the movable object information to the server via the communication base station. The second communicator communicates with the server for a larger volume of data than the first communicator at a time, or communicates with the server more frequently than the first communicator. The communication control unit causes the second communicator to transmit, selectively from the transmission information, specific transmission information including predefined movable object information to the server when the second communicator is enabled to communicate with the communication base station and when the first communicator has received an upload start instruction. The communication control unit causes the first communicator or the second communicator to transmit, selectively from the transmission information, transmission information different from the specific transmission information to the server.

An information transmission system according to a seventeenth aspect of the present disclosure includes a communication connection device and a server. The communication connection device is mountable on a movable object. The server performs information transmission with the communication connection device. The communication connection device includes an information obtaining unit, a first communicator, a second communicator, and a communication control unit. The information obtaining unit obtains movable object information about the movable object. The first communicator communicates with the server. The second communicator communicates with the server via a communication base station through short-range wireless communication. The communication control unit controls the first communicator and the second communicator. The first communicator transmits transmission information including the movable object information to the server. The second communicator transmits the transmission information including the movable object information to the server via the communication base station, or receives movable-object-dedicated information used in the movable object from the server via the communication base station. The second communicator communicates with the server for a larger volume of data than the first communicator at a time, or communicates with the server more frequently than the first communicator. The communication control unit causes the second communicator to receive the movable-object-dedicated information from the server when the second communicator is enabled to communicate with the communication base station and when the first communicator has received a download start instruction. The communication control unit causes the first communicator or the second communicator to transmit the transmission information to the server.

An information transmission system according to an eighteenth aspect of the present disclosure is the information transmission system according to the seventeenth aspect in which the server includes a first server communication unit, a server input unit, and a server control unit. The first server communication unit communicates with the first communicator. The server input unit receives a predetermined operation. The server control unit causes the first server communication unit to transmit the download start instruction to the first communicator when the server input unit receives the predetermined operation.

An information transmission system according to a nineteenth aspect of the present disclosure is the information transmission system according to the eighteenth aspect in which the movable object information includes position information about the movable object. The server includes a server display unit. The server control unit causes the server display unit to display a schematic diagram of a predetermined area in which the movable object is movable, a movable object mark indicating a position of the movable object in the schematic diagram, and a communication base station mark indicating a position of the communication base station in the schematic diagram. The server control unit causes the movable object mark in the schematic diagram to be displayed based on the position information received from the movable object.

An information transmission system according to a twentieth aspect of the present disclosure is the information transmission system according to the eighteenth aspect in which the server includes a server display unit. The server control unit determines, when the received movable object information includes version information for the movable-object-dedicated information, whether the version information is latest. The server control unit causes, when determining that the version information is not latest, the server display unit to display identification information of the movable object and determination information indicating that the version information is not latest.

A communication connection device according to a twenty-first aspect of the present disclosure is mountable on a movable object. The communication connection device includes an information obtaining unit, a first communicator, a second communicator, and a communication control unit. The information obtaining unit obtains movable object information about the movable object. The first communicator communicates with a server. The second communicator communicates with the server via a communication base station through short-range wireless communication. The communication control unit controls the first communicator and the second communicator. The first communicator transmits transmission information including the movable object information to the server. The second communicator transmits the transmission information including the movable object information to the server via the communication base station, or receives movable-object-dedicated information used in the movable object from the server via the communication base station. The second communicator communicates with the server for a larger volume of data than the first communicator at a time, or communicates with the server more frequently than the first communicator. The communication control unit causes the second communicator to receive the movable-object-dedicated information from the server when the second communicator is enabled to communicate with the communication base station and when the first communicator has received a download start instruction. The communication control unit causes the first communicator or the second communicator to transmit the transmission information to the server.

An information transmission method according to a twenty-second aspect of the present disclosure is a method for a communication connection device mountable on a movable object to transmit information to a server. The communication connection device includes a first communicator and a second communicator. The first communicator communicates with the server. The second communicator communicates with the server via a communication base station through short-range wireless communication. The second communicator communicates with the server for a larger volume of data than the first communicator at a time, or communicates with the server more frequently than the first communicator. The information transmission method according to the twenty-second aspect includes obtaining, with the communication connection device, movable object information about the movable object, receiving, with the second communicator, movable-object-dedicated information used in the movable object from the server when the second communicator is enabled to communicate with the communication base station and when the first communicator has received a download start instruction, and transmitting, from the first communicator or the second communicator, transmission information including the movable object information to the server.

A non-transitory computer-readable storage medium according to a twenty-third aspect of the present disclosure stores a program for causing a computer to function as an information obtaining unit and a communication control unit. The information obtaining unit obtains movable object information about a movable object. The communication control unit controls a first communicator and a second communicator. The first communicator communicates with a server. The second communicator communicates with the server via a communication base station through short-range wireless communication. The first communicator transmits transmission information including movable object information to the server. The second communicator transmits the transmission information including the movable object information to the server via the communication base station, or receives movable-object-dedicated information used in the movable object from the server via the communication base station. The second communicator communicates with the server for a larger volume of data than the first communicator at a time, or communicates with the server more frequently than the first communicator. The communication control unit causes the second communicator to receive the movable-object-dedicated information from the server when the second communicator is enabled to communicate with the communication base station and when the first communicator has received a download start instruction. The communication control unit causes the first communicator or the second communicator to transmit the transmission information to the server.

One or more aspects of the present invention enable collection of movable object information at a server with high accuracy.

DETAILED DESCRIPTION

Figure 1:
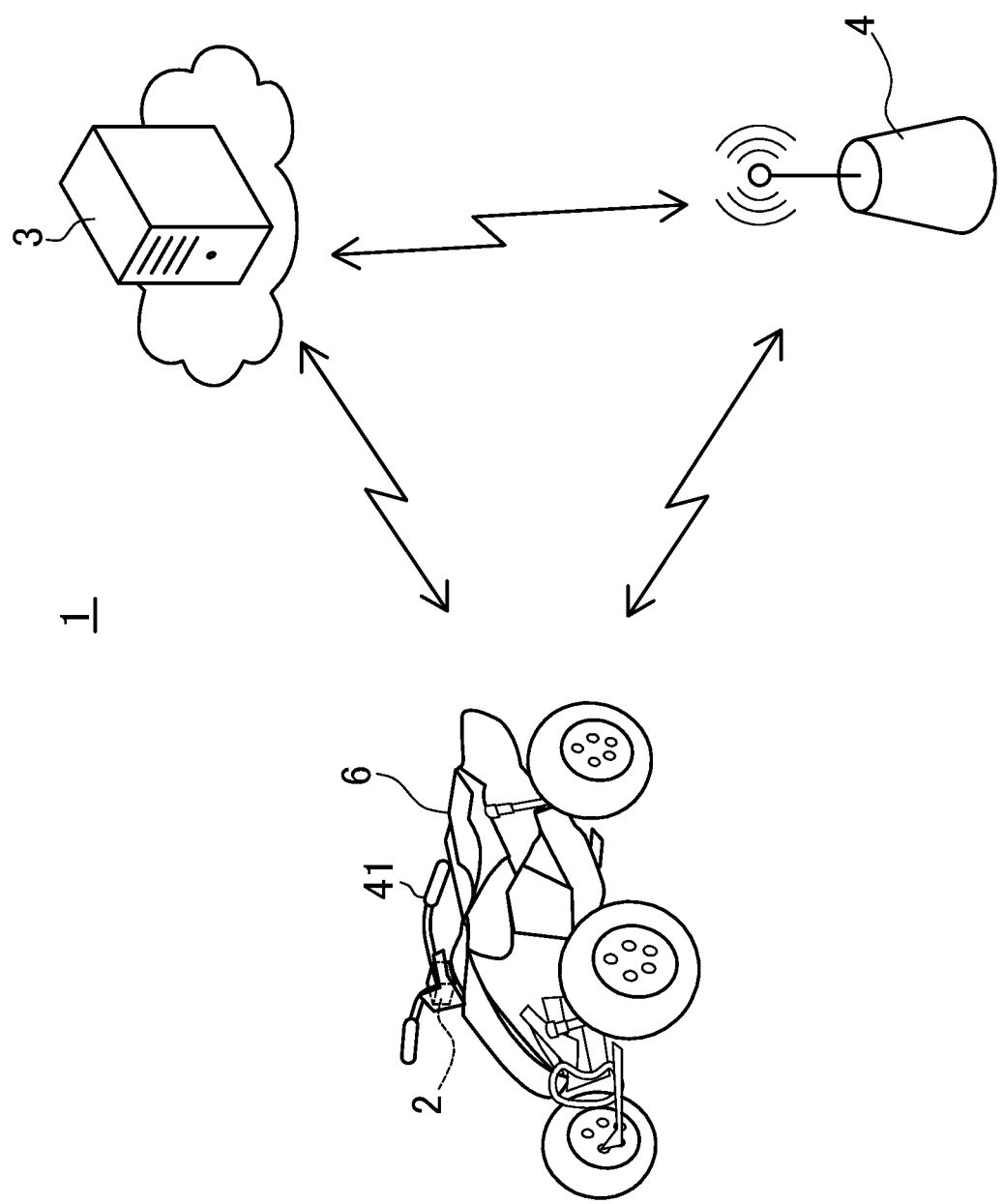
FIG. 1 is a schematic diagram of an information transmission system according to one embodiment.

An information transmission system according to an embodiment will now be described with reference to the drawings. As shown in FIG. 1, the information transmission system 1 according to the present embodiment includes a movable-object-mounted device 2, a server 3, and a communication base station 4. In FIG. 1, the arrows indicate the flow of information.

As shown in FIG. 1, the movable-object-mounted device 2 is mounted on a movable object 6. In the present embodiment, the movable object 6 is a buggy. However, the movable object 6 is not limited to a buggy. For example, the movable object 6 may be an automobile other than a buggy. The movable object 6 may be a motorcycle, a ship, or a snow vehicle. Examples of a ship include a personal watercraft and a boat. Examples of a snow vehicle include a snowmobile. The movable object 6 in the present embodiment is rented to a user. The movable object 6 in the present embodiment is to be used within a predetermined area. In the present embodiment, the predetermined area is a circuit course 5.

Figure 2:
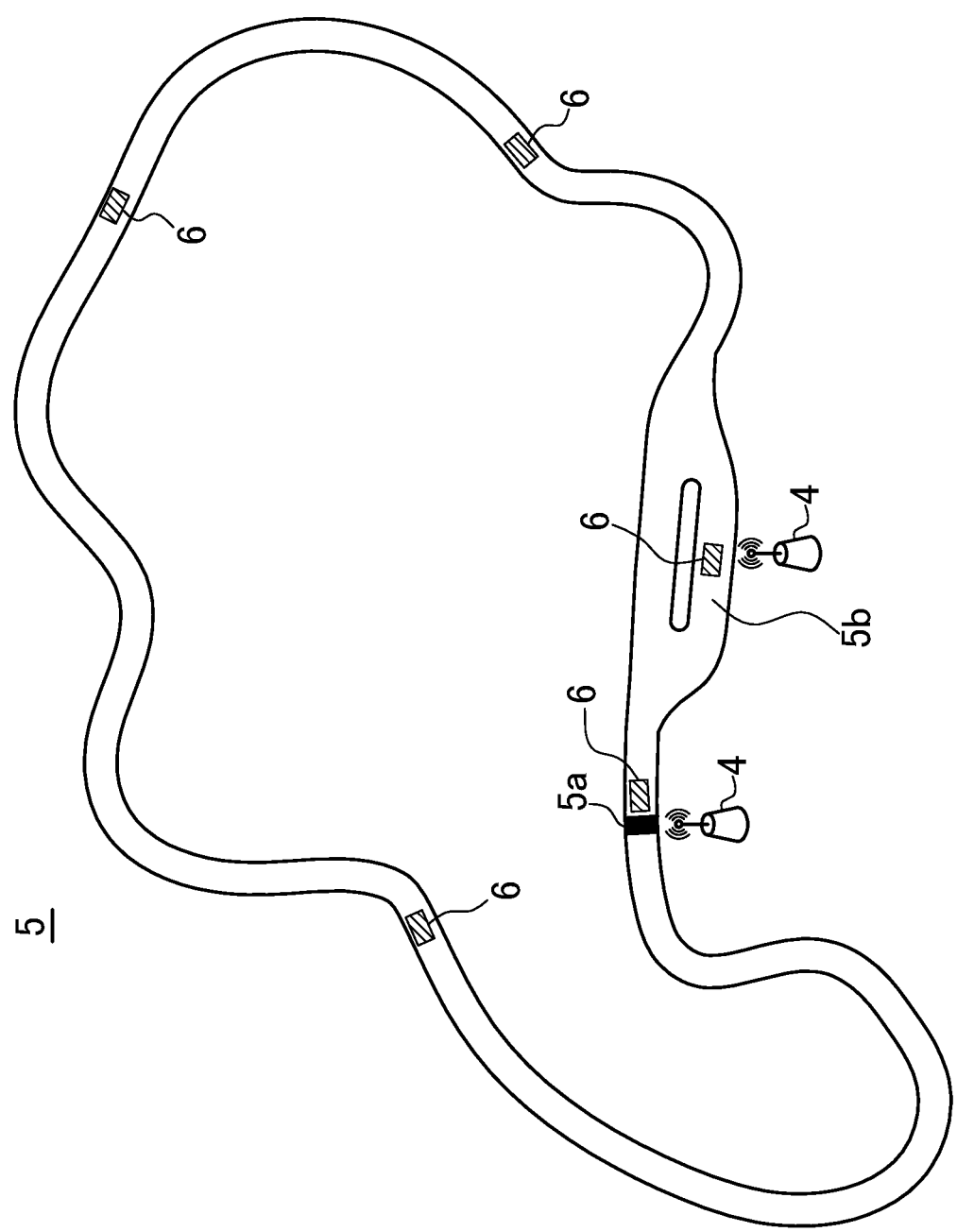
FIG. 2 is a schematic diagram of a circuit course.

As shown in FIG. 2, for example, the user operates the rented movable object 6 in the circuit course 5. The circuit course 5 includes, for example, a start and goal position 5a and a pit lane 5b.

Figure 3:
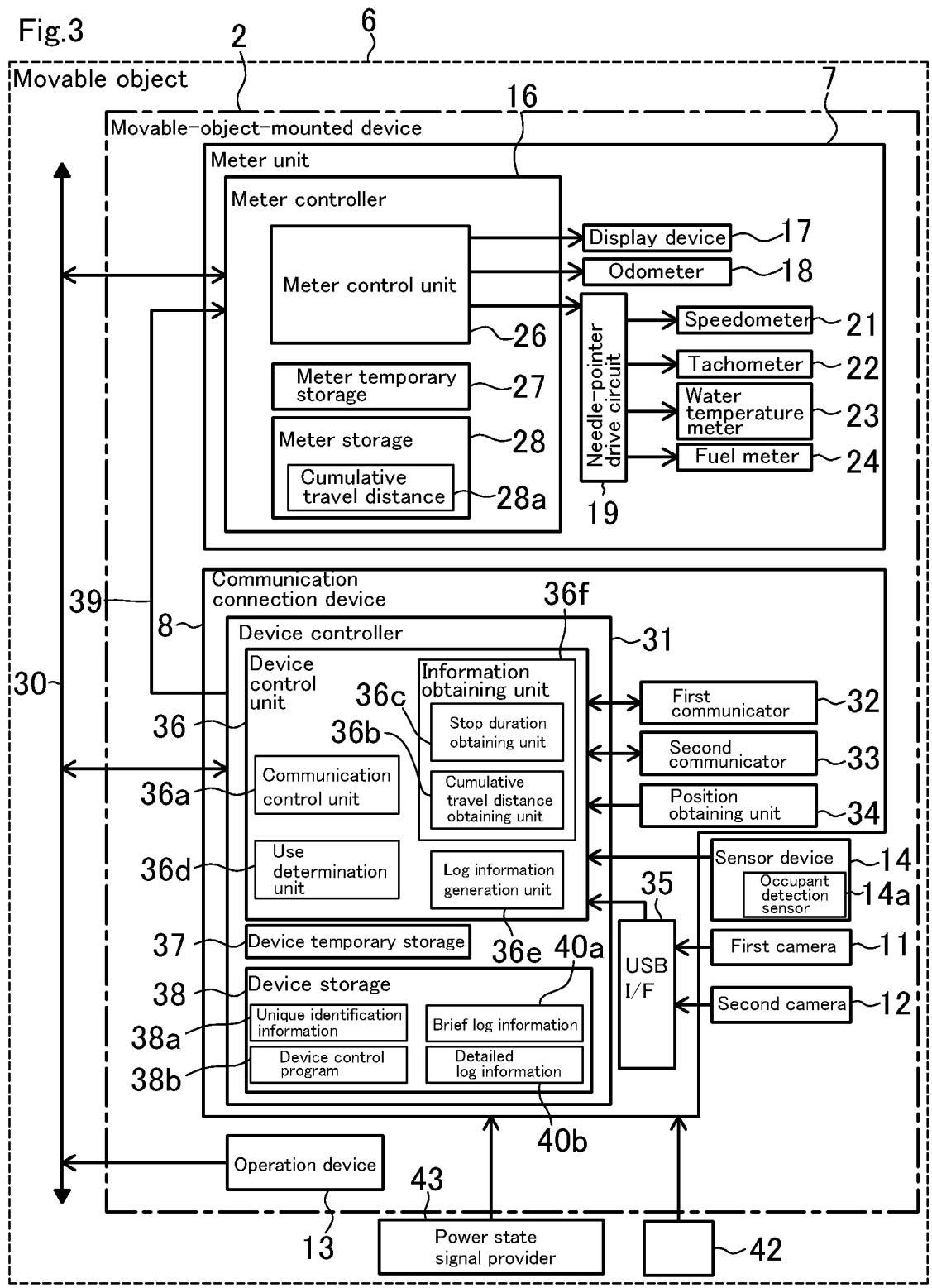
FIG. 3 is a block diagram of a movable-object-mounted device according to the present embodiment.
Figure 4:
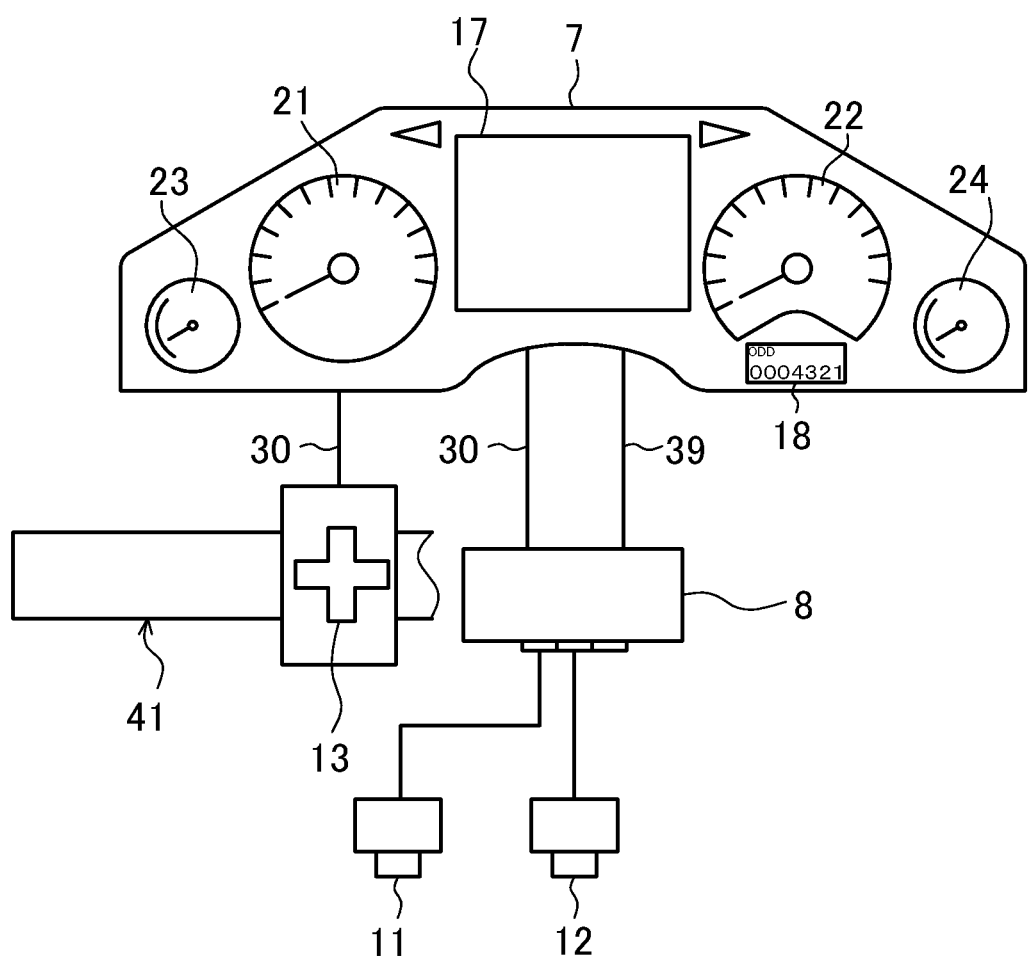
FIG. 4 is a schematic diagram of a meter unit, a communication connection device, a handlebar, and a camera according to the present embodiment.

As shown in FIGS. 3 and 4, the movable-object-mounted device 2 includes a meter unit 7, a communication connection device 8, a first camera 11, a second camera 12, and an operation device 13. The movable-object-mounted device 2 may include another camera in addition to the first camera 11 and the second camera 12. The communication connection device 8 is connected to the first camera 11, the second camera 12, and a sensor device 14.

As shown in FIG. 3, the meter unit 7 includes a meter controller 16, a display device 17, an odometer 18, a needle-pointer drive circuit 19, a speedometer 21, a tachometer 22, a water temperature meter 23, and a fuel meter 24.

The meter controller 16 includes a first control unit 26, a first temporary storage 27, and a first storage 28. Hereafter, the first control unit 26 is also referred to as a meter control unit 26. The first temporary storage 27 is also referred to as a meter temporary storage 27. The first storage 28 is also referred to as a meter storage 28. The meter controller 16 is connected to an in-vehicle local area network (LAN) 30. The in-vehicle LAN 30 may use the Controller Area Network (CAN).

The meter control unit 26 may be a central processing unit (CPU). The meter control unit 26 executes a meter control program stored in the meter storage 28 to control the display on the display device 17 and the odometer 18. The meter control unit 26 executes the meter control program stored in the meter storage 28 to control the display on the speedometer 21, the tachometer 22, the water temperature meter 23, and the fuel meter 24 through the needle-pointer drive circuit 19.

The meter temporary storage 27 temporarily stores information to be processed by the meter control unit 26. The meter temporary storage 27 may be a volatile memory. Examples of a volatile memory include a random-access memory (RAM).

The meter storage 28 stores programs including the meter control program, data to be displayed on the display device 17, and a cumulative travel distance 28a. The meter storage 28 may be a non-volatile memory. Examples of a non-volatile memory include a read-only memory (ROM) and a flash memory.

The display device 17 may be a liquid crystal display or an organic electro luminescent (EL) display. The display device 17 may be a touch panel.

The odometer 18 displays the cumulative travel distance 28a for the movable object 6. The meter control unit 26 receives information about the traveling speed of the movable object 6 through the in-vehicle LAN 30, and updates the cumulative travel distance 28a stored in the meter storage 28 as appropriate. The meter control unit 26 causes the odometer 18 to display the updated cumulative travel distance 28a. The odometer 18 may be a liquid crystal display or an organic EL display. In the present embodiment, the odometer 18 is installed separately from the display device 17. In some embodiments, the odometer 18 may be displayed on the display device 17.

The needle-pointer drive circuit 19 receives readings for the meters from the meter control unit 26, and drives motors for rotating the needles of the speedometer 21, the tachometer 22, the water temperature meter 23, and the fuel meter 24. In the present embodiment, the speedometer 21, the tachometer 22, the water temperature meter 23, and the fuel meter 24 are analog meters using a needle and a dial plate. In some embodiments, some or all of the meters may be digital meters. Also, some or all of the speedometer 21, the tachometer 22, the water temperature meter 23, and the fuel meter 24 may be displayed on the display device 17.

The communication connection device 8 is connected to the meter unit 7 with an in-vehicle LAN cable and a low voltage differential signaling (LVDS) cable. The communication connection device 8 is installed separately from the meter unit 7. The communication connection device 8 includes a device controller 31, a first communicator 32, and a second communicator 33. The first communicator 32 may be a communicator for an LPWA communication standard. The second communicator 33 may be a communicator for the Wi-Fi (registered trademark) or Bluetooth (registered trademark) communication standard. The communication connection device 8 includes a position obtaining unit 34 and a universal serial bus (USB) interface 35 in addition to the device controller 31, the first communicator 32, and the second communicator 33. In the present embodiment, the communication connection device 8 constantly receives power from a battery 42 mounted on the movable object 6.

The device controller 31 includes a second control unit 36, a second temporary storage 37, and a second storage 38. The device controller 31 may be a computer. Hereafter, the second control unit 36 is also referred to as a device control unit 36. The second temporary storage 37 is also referred to as a device temporary storage 37. The second storage 38 is also referred to as a device storage 38. The device controller 31 is connected to the in-vehicle LAN 30. The device controller 31 communicates with the meter controller 16 through the in-vehicle LAN 30. The device controller 31 transmits image data to the meter controller 16 through low-voltage differential signaling (LVDS) 39.

The device control unit 36 may be a CPU. The device control unit 36 executes a device control program 38b stored in the device storage 38 to control each unit included in the communication connection device 8. The device control unit 36 functions as, for example, a communication control unit 36a, a use determination unit 36d, a log information generation unit 36e, and an information obtaining unit 36f. The information obtaining unit 36f functions as, for example, a cumulative travel distance obtaining unit 36b and a stop duration obtaining unit 36c. The communication control unit 36a controls the first communicator 32 and the second communicator 33. For example, the communication control unit 36a causes the first communicator 32 to transmit information to the server 3 when the second communicator 33 is disabled to communicate with the communication base station 4. The communication control unit 36a causes the first communicator 32 to transmit information to the server 3 via the communication base station 4 when the second communicator 33 is enabled to communicate with the communication base station 4.

The second communicator 33 is disabled to communicate with the communication base station 4 when, for example, the second communicator 33 is at a certain distance away from the communication base station 4. The second communicator 33 is connected to the communication base station 4 through short-range wireless communication, and thus is disabled to communicate with the communication base station 4 when at a certain distance away from the communication base station 4.

The second communicator 33 is disabled to communicate with the communication base station 4 when, for example, the movable object 6 is powered off. The second communicator 33 consumes more power than the first communicator 32, and can thus drain the battery 42 when used while the movable object 6 is powered off. The communication control unit 36a determines that the movable object 6 is powered off when, for example, the accessory power source is off. As shown in FIG. 3, the communication control unit 36a determines whether the accessory power source is on based on a signal provided by a power state signal provider 43. The communication control unit 36a may determine that the movable object 6 is powered off when being unable to communicate with the meter controller 16 through the in-vehicle LAN 30. The communication control unit 36a is not limited to determining whether the movable object 6 is powered on, but may stop the operation of the second communicator 33 when determining that the accessory power source is off.

The cumulative travel distance obtaining unit 36b obtains the cumulative travel distance from the meter controller 16 through the in-vehicle LAN 30. More specifically, the cumulative travel distance obtaining unit 36b requests, through the in-vehicle LAN 30, the meter control unit 26 to transmit the cumulative travel distance 28a for the movable object 6. The meter control unit 26 reads the cumulative travel distance 28a for the movable object 6 stored in the meter storage 28 in response to the request from the cumulative travel distance obtaining unit 36b. The meter control unit 26 transmits the read cumulative travel distance 28a to the device control unit 36.

The stop duration obtaining unit 36c obtains a stop duration for the movable object 6. The stop duration obtaining unit 36c measures, for example, a duration for which position information about the movable object 6 obtained by the position obtaining unit 34 is indicating the same position.

The stop duration obtaining unit 36c obtains the measured duration as a stop duration for the movable object 6. The stop duration obtaining unit 36c may obtain a duration for which the ignition power source is off as a stop duration for the movable object 6.

The use determination unit 36d determines whether the movable object 6 is in use. The use determination unit 36d determines whether the movable object 6 is in use based on, for example, information detectable when the movable object 6 carries a person. The use determination unit 36d determines that the movable object 6 is not in use when, for example, the stop duration for the movable object 6 obtained by the stop duration obtaining unit 36c has reached a predetermined duration. The use determination unit 36d may determine that the movable object 6 is not in use when, for example, the ignition power source is off while the accessory power source is on. The use determination unit 36d may determine that the movable object 6 is not in use when, for example, the movable object 6 has no seat being occupied. The use determination unit 36d determines whether the movable object 6 has an occupied seat based on, for example, a signal from an occupant detection sensor 14a.

The log information generation unit 36e generates log information associated with movable object information. The log information generation unit 36e generates log information associated with, for example, position information about the movable object 6 obtained from the position obtaining unit 34, information obtained from the sensor device 14, and movable object information obtained through the in-vehicle LAN 30. Examples of movable object information obtained by the log information generation unit 36e through the in-vehicle LAN 30 include information about the degree of opening of a throttle, information about the on/off state of a brake, settings information, information about the on/off state of an anti-lock braking system, information about an engine output mode, information about the on/off state of the traction control operation, error information, warning information, and various items of sensor information. The log information generation unit 36e also obtains various programs and data to be displayed stored in the meter storage 28 through the in-vehicle LAN 30. The log information generation unit 36e generates brief log information 40a with a longer sampling period, and detailed log information 40b with a shorter sampling period. The log information generation unit 36e temporarily stores the generated brief log information 40a and the detailed log information 40b into the device storage 38. The communication control unit 36a transmits, together with unique identification information 38a, the brief log information 40a and the detailed log information 40b temporarily stored in the device storage 38 to the server 3 through the first communicator 32 or the second communicator 33.

The information obtaining unit 36f obtains movable object information about the movable object 6. The information obtaining unit 36f functions as, for example, the stop duration obtaining unit 36c and the cumulative travel distance obtaining unit 36b. The information obtaining unit 36f may obtain other items of movable object information in addition to a stop duration and the cumulative travel distance for the movable object 6. The information obtaining unit 36f may obtain position information from the position obtaining unit 34 when, for example, movable object information is position information about the movable object 6. The information obtaining unit 36f may obtain sensor information from the sensor device 14 when, for example, movable object information is sensor information indicating the state of the movable object 6 detected by the sensor device 14.

The information obtaining unit 36f may obtain log information from the log information generation unit 36e when, for example, movable object information is log information associated with movable object information. The information obtaining unit 36f may obtain version information from a device or a storage storing the version information when, for example, movable object information is version information for movable-object-dedicated information used in the movable object 6. Examples of movable-object-dedicated information used in the movable object 6 include programs to be executed by a device mounted on the movable object 6.

The device temporary storage 37 temporarily stores information to be processed by the device control unit 36. The device temporary storage 37 may be a volatile memory. Examples of a volatile memory include a RAM.

The device storage 38 stores various programs including the device control program 38b and unique identification information 38a. The device storage 38 may be a non-volatile memory. Examples of a non-volatile memory include a ROM and a flash memory.

The first communicator 32 communicates with the server 3. The first communicator 32 transmits transmission information including movable object information about the movable object 6 to the server 3. The first communicator 32 transmits information to the server 3 at predetermined time intervals at constant frequencies. Movable object information includes, for example, the cumulative travel distance for the movable object 6, position information about the movable object 6, and brief log information 40a about various values obtained at the movable object 6. The first communicator 32 communicates with the server 3 through, for example, LPWA communication. LPWA communication transmits a small volume of data at a time, and has a limited number of times of transmission per day. However, LPWA communication enables low-power-consumption communication across a relatively wide area. The first communicator 32 complying with the LPWA standard can transmit radio waves across a wide area having a radius ranging, for example, from a few to several tens of kilometers. The first communicator 32 using LPWA communication achieves a communication speed ranging, for example, from 100 bps to several tens of Kbps. A communicator complying with the LPWA standard enables communication using, for example, the 920 MHz band or the 2.4 GHz band. In the present embodiment, the first communicator 32 performs communication at predetermined time intervals to limit the number of times of transmission per day. The predetermined time intervals may be constant time intervals or time intervals defined as appropriate.

The second communicator 33 communicates with the server 3 via the communication base station 4. The second communicator 33 transmits transmission information including movable object information about the movable object 6 to the server 3 via the communication base station 4. The second communicator 33 transmits information having a larger volume of data than the first communicator 32 at a time. The second communicator 33 transmits information more frequently than the first communicator 32. The second communicator 33 communicates with the communication base station 4 through, for example, short-range wireless communication. Short-range wireless communication enables communication across a relatively small area, or within a radius ranging, for example, from a few centimeters to several tens of meters (e.g., within 50 m). Examples of short-range wireless communication include communication in accordance with the Wi-Fi (registered trademark)

standard or the Bluetooth (registered trademark) standard. The second communicator 33 using the Wi-Fi standard transmits radio waves across an area with a radius ranging, for example, from 100 to 300 m. The second communicator 33 using the Wi-Fi standard transmits information with a communication speed of, for example, 54 Mbps. The second communicator 33 using the Bluetooth standard transmits radio waves across an area with a radius ranging, for example, from 10 to 100 m. The second communicator 33 using the Bluetooth standard transmits information with a communication speed of, for example, 24 Mbps.

The position obtaining unit 34 obtains position information about the movable object 6. The position obtaining unit 34 provides the obtained position information about the movable object 6 to the device control unit 36. The position obtaining unit 34 may be a global positioning system (GPS) sensor for a satellite navigation system. Position information includes latitude information, longitude information, and the time at which the position information is obtained.

The USB interface 35 is connected to the first camera 11 and the second camera 12. For example, the first camera 11 is installed to capture images in front of the movable object 6. The second camera 12 is installed to capture images behind the movable object 6.

The first camera 11 functions as a camera for a drive recorder. More specifically, the device control unit 36 obtains captured image data captured by the first camera 11. The device control unit 36 stores the obtained captured image data into the device storage 38. The device control unit 36 transmits, to the server 3, the captured image data stored in the device storage 38 together with position information about the movable object 6 and the unique identification information 38a through the second communicator 33.

The second camera 12 functions as a digital mirror. More specifically, the device control unit 36 transmits captured image data captured by the second camera 12 to the meter control unit 26 in the meter controller 16. The meter control unit 26 causes the display device 17 to display the captured image data obtained from the device control unit 36.

The first camera 11 and the second camera 12 may be connected to the device control unit 36 through communication in accordance with the Wi-Fi standard or the Bluetooth standard instead of using the USB interface 35.

The operation device 13 receives input operations from the user. The operation device 13 transmits signals corresponding to a received input operation to the meter control unit 26 and the device control unit 36 through the in-vehicle LAN 30. The meter control unit 26 and the device control unit 36 each perform processing in response to the signals received from the operation device 13. In the present embodiment, the operation device 13 is installed on a handlebar 41 of the movable object 6 as shown in FIG. 4.

For example, the user performs a predetermined input operation with the operation device 13 to display a moving image of the rear of the movable object 6 on the display device 17. This enables the digital mirror function. In this case, image data captured by the second camera 12 is transmitted from the device control unit 36 to the meter control unit 26. The meter control unit 26 displays the captured image data received from the device control unit 36 on the display device 17.

The sensor device 14 obtains sensor information about the movable object 6. The sensor device 14 provides the obtained sensor information about the movable object 6 to the device control unit 36. Examples of the sensor device 14 include a pneumatic sensor device for obtaining information about the pneumatic pressures of the tires of the movable object 6, the occupant detection sensor 14a, and an inertial measurement unit (IMU). Although the sensor device 14 is installed outside the communication connection device 8, the sensor device 14 may be installed inside the communication connection device 8. The sensor device 14 may provide the obtained sensor information about the movable object 6 to the device control unit 36 through the in-vehicle LAN 30. The occupant detection sensor 14a may specifically detect occupancy or vacancy of each seat. This yields information about the number of occupants per movable object 6. The occupant detection sensor 14a may include, for example, a pressure sensor.

The communication base station 4 is an access point for short-range wireless communication. The communication base station 4 connects the second communicator 33 connected through short-range wireless communication to a LAN or a wide area network (WAN). The communication base station 4 is installed within an area allowing short-range wireless communication around a stop position for the movable object 6 to stop relatively frequently. In the present embodiment, as shown in FIG. 2, the start and goal position 5a and the pit lane 5b are stop positions for the movable object 6 to stop relatively frequently. The communication base stations 4 are installed to allow short-range wireless communication with the second communicator 33 mounted on the movable object 6 stopping at the start and goal position 5a or the pit lane 5b.

Figure 5:
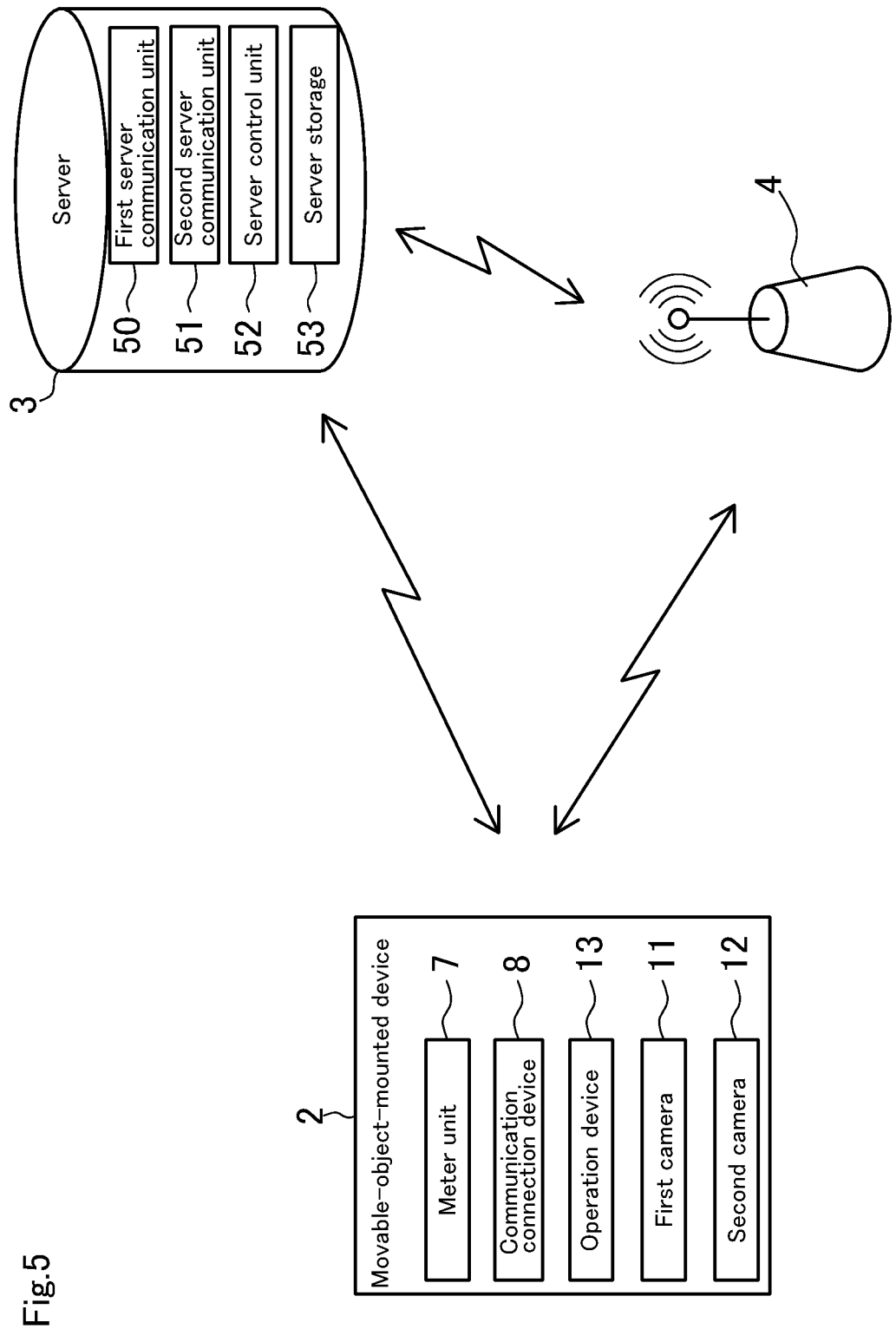
FIG. 5 is a schematic block diagram of the movable-object-mounted device, a server, and a communication base station according to the present embodiment.

As shown in FIG. 5, the server 3 includes a first server communication unit 50, a second server communication unit 51, a server control unit 52, and a server storage 53.

The first server communication unit 50 communicates with the first communicator 32 in the communication connection device 8. The first server communication unit 50 communicates with the first communicator 32 through, for example, LPWA communication. LPWA communication between the first server communication unit 50 and the first communicator 32 is preformed through a gateway for LPWA communication. In more detail, the first server communication unit 50 is connected to the gateway for LPWA communication with a computer network. The gateway for LPWA communication communicates with the first communicator 32 through LPWA communication.

The second server communication unit 51 communicates with the second communicator 33 in the communication connection device 8 via the communication base station 4. The second server communication unit 51 is connected to the communication base station 4 with a computer network. The communication base station 4 is connected to the second communicator 33 in the communication connection device 8 through short-range wireless communication.

The server control unit 52 may be a CPU. The server control unit 52 controls the server storage 53 to store movable object information received from the communication connection device 8 mounted on the movable object 6. The server control unit 52 receives movable object information from the communication connection device 8 mounted on the movable object 6. When the movable object information includes version information for movable-object-dedicated information used in the movable object 6, the server control unit 52 determines whether the version information is latest. When determining that the received version information for the movable-object-dedicated information is not latest, the server control unit 52 reads the latest movable-object-dedicated information from the server storage 53 and transmits the information to the communication connection device 8 when the second server communication unit 51 is connected to the second communicator 33 in the communication connection device 8 mounted on the movable object 6. Examples of movable-object-dedicated information include image data to be displayed in the movable object 6 and programs for the movable object 6. When the movable object 6 provides its occupant with image data for augmented reality (AR) or virtual reality (VR) on a head mount display, the image data for the head mount display is also movable-object-dedicated information to be updated as appropriate.

The server storage 53 may be a non-volatile memory. The server storage 53 stores movable object information received from the communication connection device 8. The server storage 53 stores movable-object-dedicated information for updating. When including multiple movable objects 6, the information transmission system 1 according to the present embodiment causes the server storage 53 to store brief log information 40a and detailed log information 40b each corresponding to unique identification information 38a received from the communication connection device 8 mounted on each movable object 6.

An information transmission method implemented with the information transmission system 1 according to the present embodiment will now be described with reference to the flowcharts shown in FIGS. 6 to 8. The information transmission method according to the present embodiment includes steps from obtaining movable object information about the movable object 6 with the communication connection device 8 to transmitting the information from the communication connection device 8 to the server 3.

Figure 6:
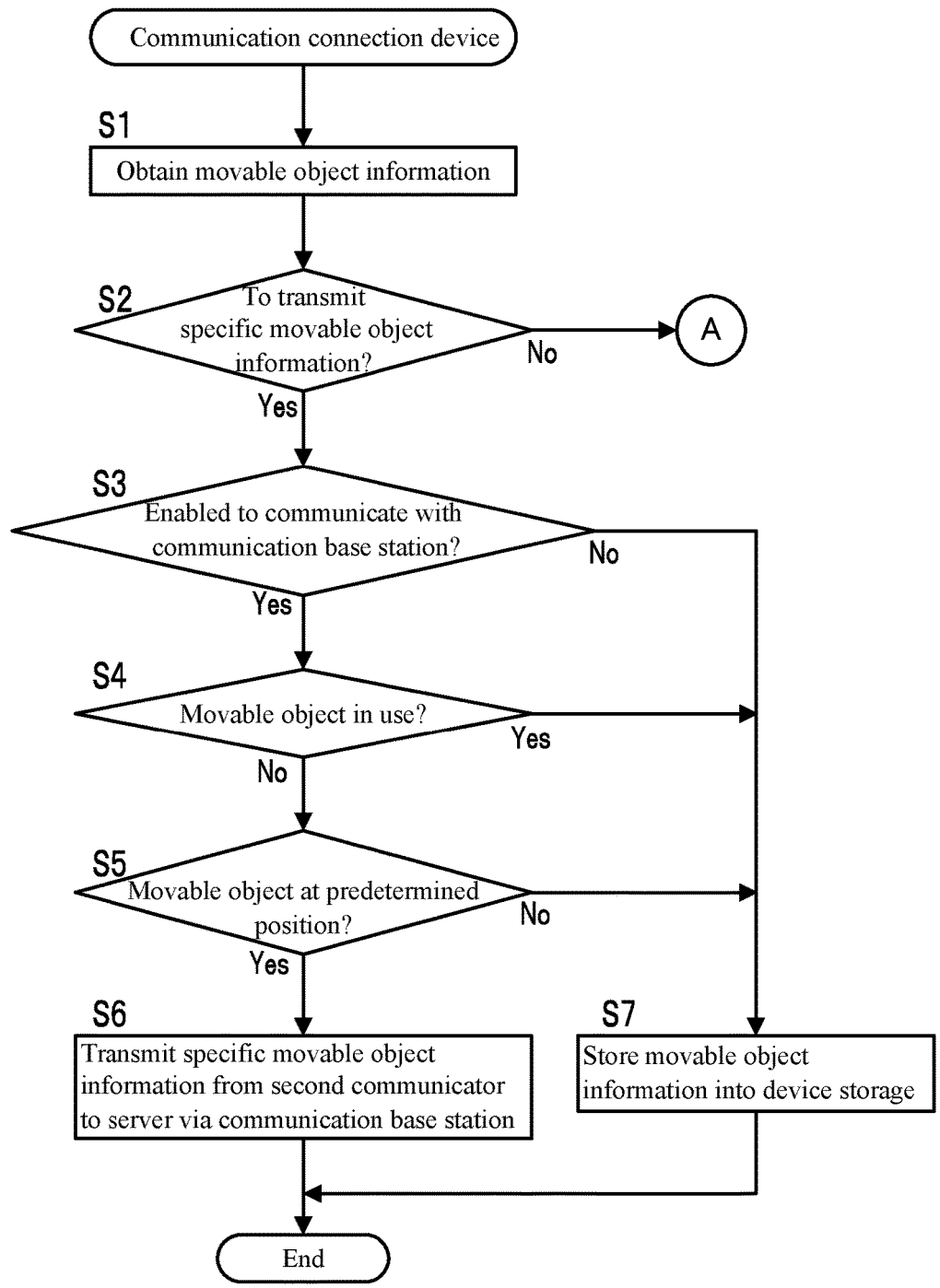
FIG. 6 is a flowchart showing the processing performed by the communication connection device according to the present embodiment.
Figure 7:
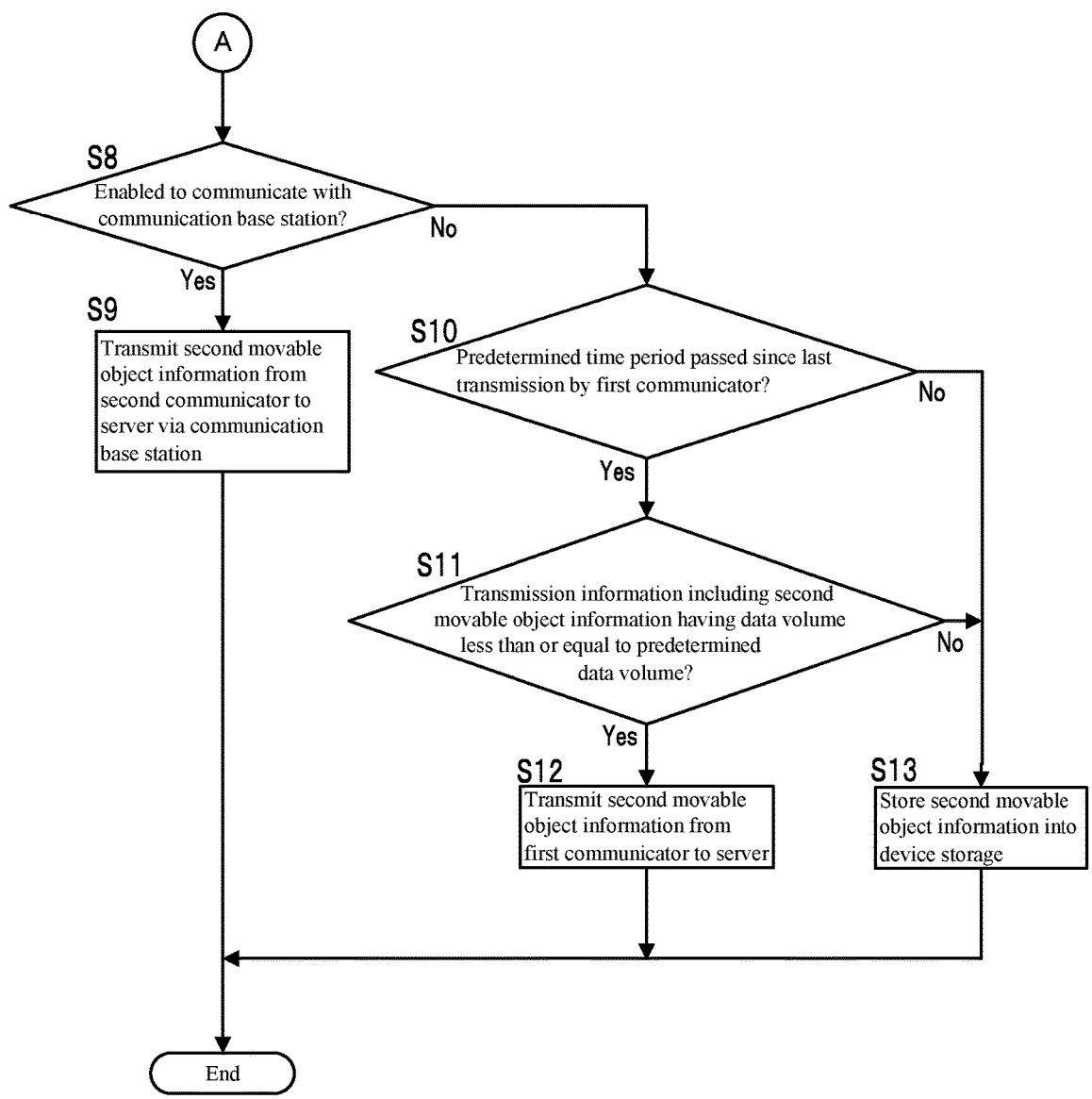
FIG. 7 is another flowchart showing the processing performed by the communication connection device according to the present embodiment.

As shown in FIG. 6, the information obtaining unit 36f first obtains movable object information (step 1). Hereafter, each step is referred to as S. Examples of movable object information to be obtained include the position information about the movable object 6, the cumulative travel distance 28a, the unique identification information 38a, the version information for movable-object-dedicated information, the brief log information 40a, and the detailed log information 40b.

The communication control unit 36a determines whether the second communicator 33 is enabled to communicate with the communication base station 4 (S3) to transmit specific movable object information selectively from the movable object information obtained by the information obtaining unit 36f (Yes in S2). Hereafter, specific movable object information is also referred to as first movable object information. In the present embodiment, for example, image data with a data size larger than or equal to a predetermined value, and detailed log information 40b are preset as first movable object information.

When the communication control unit 36a determines that the second communicator 33 is enabled to communicate with the communication base station 4 (Yes in S3), the use determination unit 36d determines whether the movable object 6 is in use (S4).

When the use determination unit 36d determines that the movable object 6 is not in use (No in S4), the communication control unit 36a determines whether the movable object 6 is at a predetermined position (S5) based on position information about the movable object 6 obtained by the information obtaining unit 36f. In the present embodiment, the predetermined position corresponds to the pit lane 5b. The determinations in S3 to S5 may be performed in a different order. Also, any one or two of the determinations in S3 to S5 may be eliminated in another embodiment.

When the second communicator 33 is enabled to communicate with the communication base station 4, and the use determination unit 36d determines that the movable object 6 is not in use when the movable object 6 is determined to be at the predetermined position, the communication control unit 36a causes the second communicator 33 to transmit specific transmission information including specific movable object information to the server 3 via the communication base station 4 (S6). The above steps (S3 to S6) cause the communication control unit 36a to transmit specific transmission information while the movable object 6 is not in use. This reduces the likelihood that the communication for transmitting information is interrupted. Thus, the information transmission system 1 according to the present embodiment more reliably transmits, to the server 3, specific movable object information with a large data size to be transmitted without interruption. Also, the communication control unit 36a transmits specific transmission information while the movable object 6 remains at the predetermined position. Thus, when the predetermined position is set at the pit lane 5b for example, the communication control unit 36a transmits specific movable object information while the movable object 6 is stopped at the pit lane 5b.

When determining that the second communicator 33 is disabled to communicate with the communication base station 4 (No in S3), the communication control unit 36a does not transmit the obtained movable object information but temporarily stores the information into the device storage 38 (S7).

When the use determination unit 36d determines that the movable object 6 is in use (Yes in S4), the communication control unit 36a does not transmit the obtained movable object information but temporarily stores the information into the device storage 38 (S7).

When determining that the movable object 6 is not at the predetermined position (No in S5), the communication control unit 36a does not transmit the obtained movable object information but temporarily stores the information into the device storage 38 (S7).

To transmit movable object information different from specific movable object information (No in S2), the communication control unit 36a determines whether the second communicator 33 is enabled to communicate with the communication base station 4 (S8). Hereafter, movable object information different from specific movable object information is also referred to as second movable object information.

When determining that the second communicator 33 is enabled to communicate with the communication base station 4 (Yes in S8), the communication control unit 36a causes the second communicator 33 to transmit transmission information including second movable object information to the server 3 via the communication base station 4 (S9).

When determining that the second communicator 33 is disabled to communicate with the communication base station 4 (No in S8), the communication control unit 36a determines whether a predetermined time period has passed since the last transmission of movable object information by the first communicator 32 (S10). This determination enables the first communicator 32 to transmit information at predetermined time intervals.

When determining that the predetermined time period has passed since the last transmission of movable object information by the first communicator 32 (Yes in S10), the communication control unit 36a determines whether the data volume of transmission information including second movable object information is less than or equal to a predetermined data volume (S11).

When determining that the data volume of transmission information including second movable object information is less than or equal to the predetermined data volume (Yes in S11), the communication control unit 36a causes the first communicator 32 to transmit the transmission information including the second movable object information to the server 3 (S12).

When determining that the predetermined time period has yet to pass since the last transmission of movable object information by the first communicator 32 (No in S10), the communication control unit 36a transmits no second movable object information but temporarily stores the information into the device storage 38 (S13).

When determining that the data volume of transmission information including second movable object information exceeds the predetermined data volume (No in S11), the communication control unit 36a transmits no second movable object information but temporarily stores the information into the device storage 38 (S13). When second movable object information is, for example, image data having a large volume of data to be transmitted at a time, the information is not transmitted by the first communicator 32 that transmits a limited volume of data at a time, but temporarily stored into the device storage 38.

Figure 8:
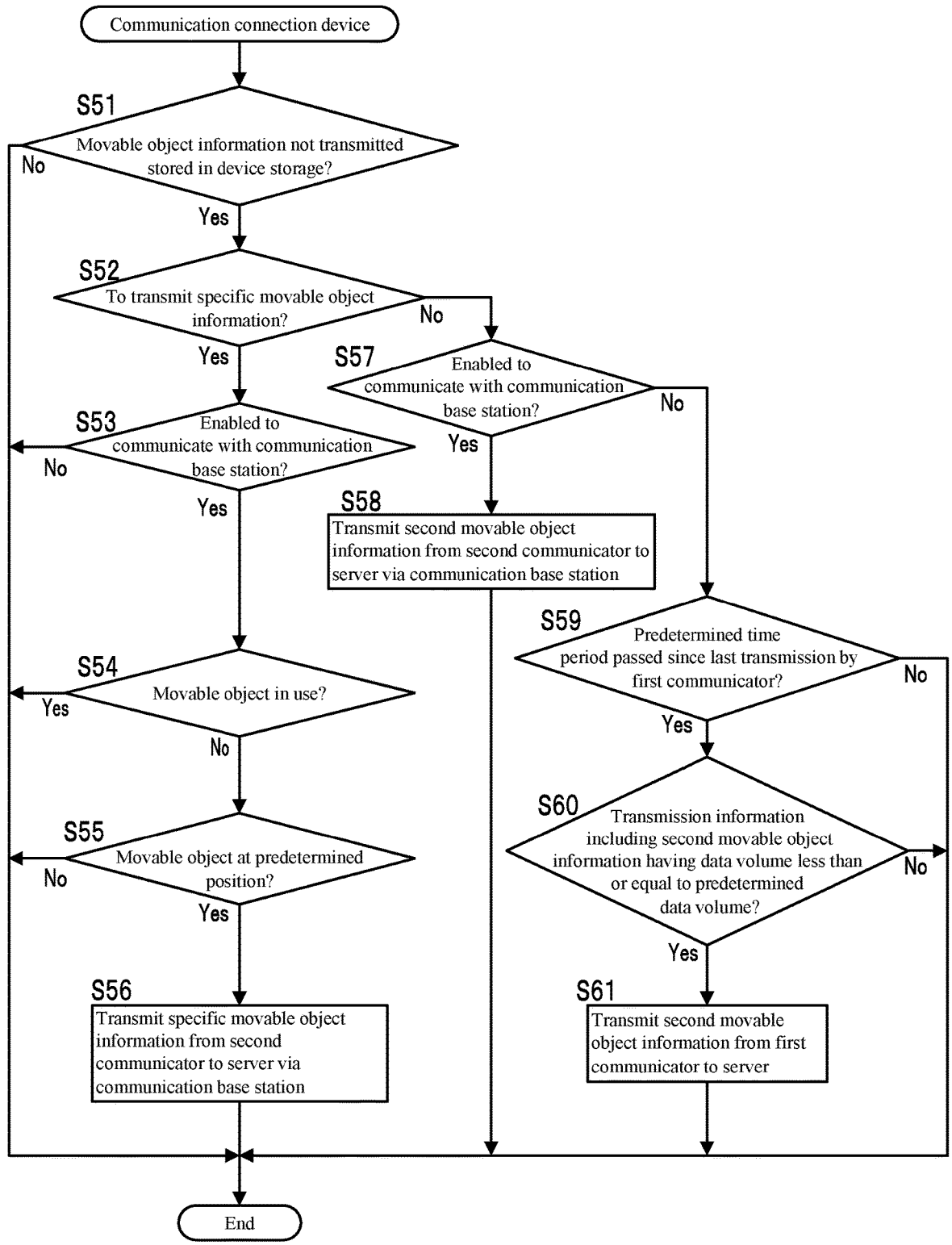
FIG. 8 is still another flowchart showing the processing performed by the communication connection device according to the present embodiment.

In addition to the above steps, as shown in FIG. 8, the communication control unit 36a repeatedly determines whether movable object information that has not been transmitted remains stored in the device storage 38 at predetermined time intervals (S51).

When the device storage 38 stores movable object information that has not been transmitted (Yes in S51), and specific movable object information selectively from the movable object information stored in the device storage 38 is to be transmitted (Yes in S52), the communication control unit 36a determines whether the second communicator 33 is enabled to communicate with the communication base station 4 (S53).

When determining that the second communicator 33 is enabled to communicate with the communication base station 4 (Yes in S53), the communication control unit 36a determines whether the movable object 6 is in use with the use determination unit 36d in the device control unit 36 (S54).

When the use determination unit 36d determines that the movable object 6 is not in use (No in S54), the communication control unit 36a further determines whether the movable object 6 is at the predetermined position based on position information about the movable object 6 obtained by the information obtaining unit 36f (S55). In the present embodiment, the predetermined position corresponds to the pit lane 5b. The determinations in S53 to S55 may be performed in a different order. Also, any one or two of the determinations in S53 to S55 may be eliminated in another embodiment.

When the second communicator 33 is enabled to communicate with the communication base station 4, and the use determination unit 36d determines that the movable object 6 is not in use when the movable object 6 is determined to be at the predetermined position, the communication control unit 36a causes the second communicator 33 to transmit specific transmission information including specific movable object information to the server 3 via the communication base station 4 (S56).

When determining that the second communicator 33 is disabled to communicate with the communication base station 4 (No in S53), the communication control unit 36a ends the processing without transmitting specific movable object information stored in the device storage 38. When the use determination unit 36d determines that the movable object 6 is in use (Yes in S54), the communication control unit 36a ends the processing without transmitting specific movable object information stored in the device storage 38. When determining that the movable object 6 is not at the predetermined position (No in S55), the communication control unit 36a ends the processing without transmitting specific movable object information stored in the device storage 38. After the predetermined time period, the communication control unit 36a re-determines whether the device storage 38 stores movable object information that has not been transmitted (S51).

To transmit second movable object information (No in S52), the communication control unit 36a determines whether the second communicator 33 is enabled to communicate with the communication base station 4 (S57).

When determining that the second communicator 33 is enabled to communicate with the communication base station 4 (Yes in S57), the communication control unit 36a causes the second communicator 33 to transmit transmission information including second movable object information to the server 3 via the communication base station 4 (S58).

When determining that the second communicator 33 is disabled to communicate with the communication base station 4 (No in S57), the communication control unit 36a determines whether the predetermined time period has passed since the last transmission of movable object information by the first communicator 32 (S59). This determination enables the first communicator 32 to transmit information at predetermined time intervals.

When determining that the predetermined time period has passed since the last transmission of movable object information by the first communicator 32 (Yes in S59), the communication control unit 36a determines whether the data volume of transmission information including second movable object information is less than or equal to the predetermined data volume (S60).

When determining that the data volume of transmission information including second movable object information is less than or equal to the predetermined data volume (Yes in S60), the communication control unit 36a causes the first communicator 32 to transmit the transmission information including the second movable object information to the server 3 (S61).

When determining that the predetermined time period has yet to pass since the last transmission of movable object information by the first communicator 32 (No in S59), the communication control unit 36a ends the processing without transmitting second movable object information stored in the device storage 38. After the predetermined time period, the communication control unit 36a re-determines whether the device storage 38 stores movable object information that has not been transmitted (S51).

When determining that the data volume of transmission information including second movable object information stored in the device storage 38 exceeds the predetermined data volume (No in S60), the communication control unit 36a ends the processing without transmitting the second movable object information stored in the device storage 38. After the predetermined time period, the communication control unit 36a re-determines whether the device storage 38 stores movable object information that has not been transmitted (S51).

The communication control unit 36a repeats the above steps to cause the second communicator 33 to transmit specific movable object information to the server 3, and the first communicator 32 or the second communicator 33 to transmit second movable object information to the server 3.

Figure 9:
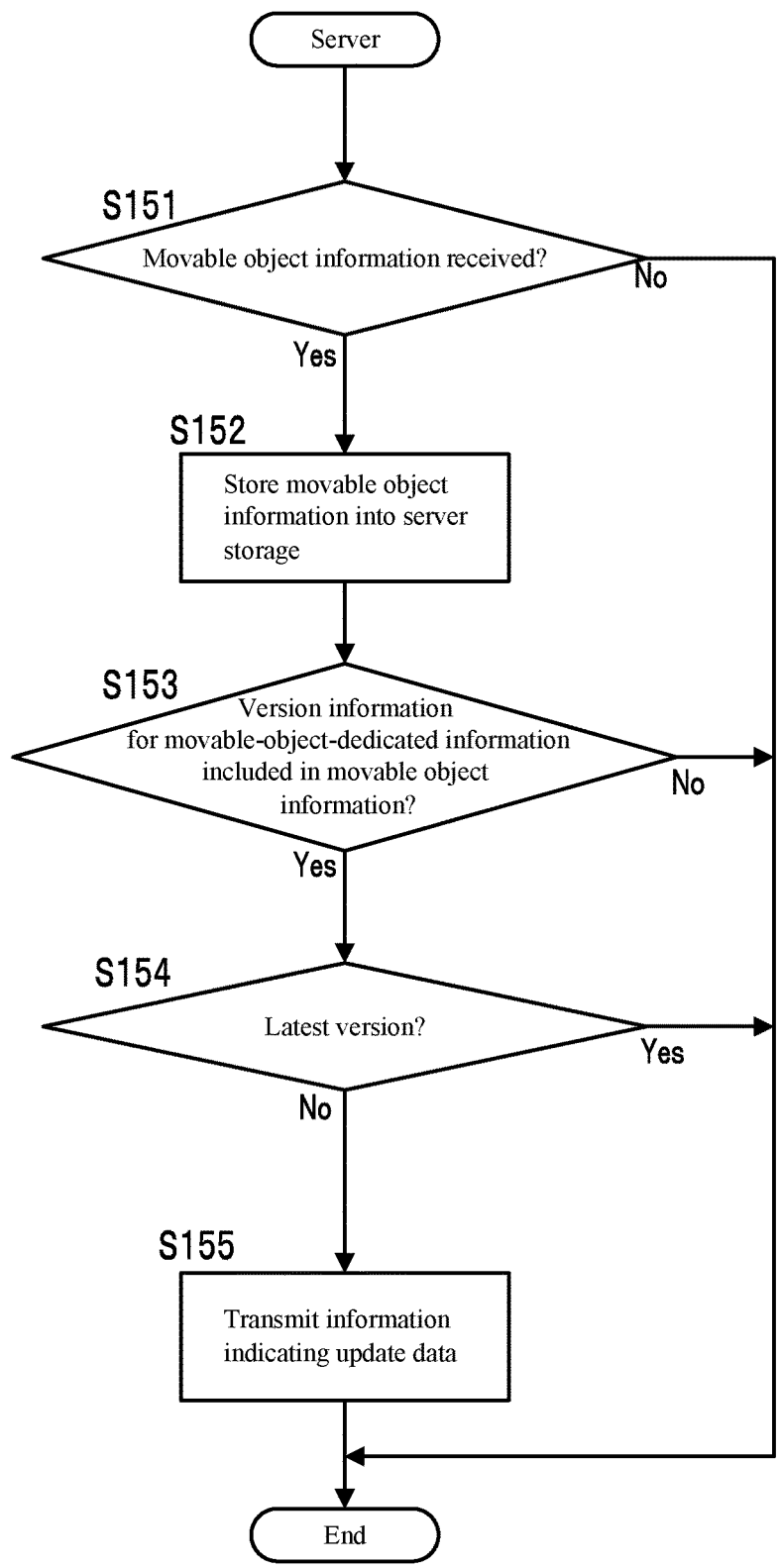
FIG. 9 is a flowchart showing the processing performed by the server according to the present embodiment.

In the server 3, as shown in FIG. 9, the server control unit 52 receives movable object information from the communication connection device 8 through the first server communication unit 50 or the second server communication unit 51 (S151), and stores the received movable object information into the server storage 53 (S152).

The server control unit 52 determines whether the received movable object information includes version information for movable-object-dedicated information (S153).

When determining that the received movable object information includes version information for movable-object-dedicated information (Yes in S153), the server control unit 52 determines whether the version information is latest (S154).

When determining that the version information is not latest (No in S154), the server control unit 52 causes the first server communication unit 50 to transmit information indicating the availability of update data to the communication connection device 8 through the first communicator 32 (S155).

Figure 10:
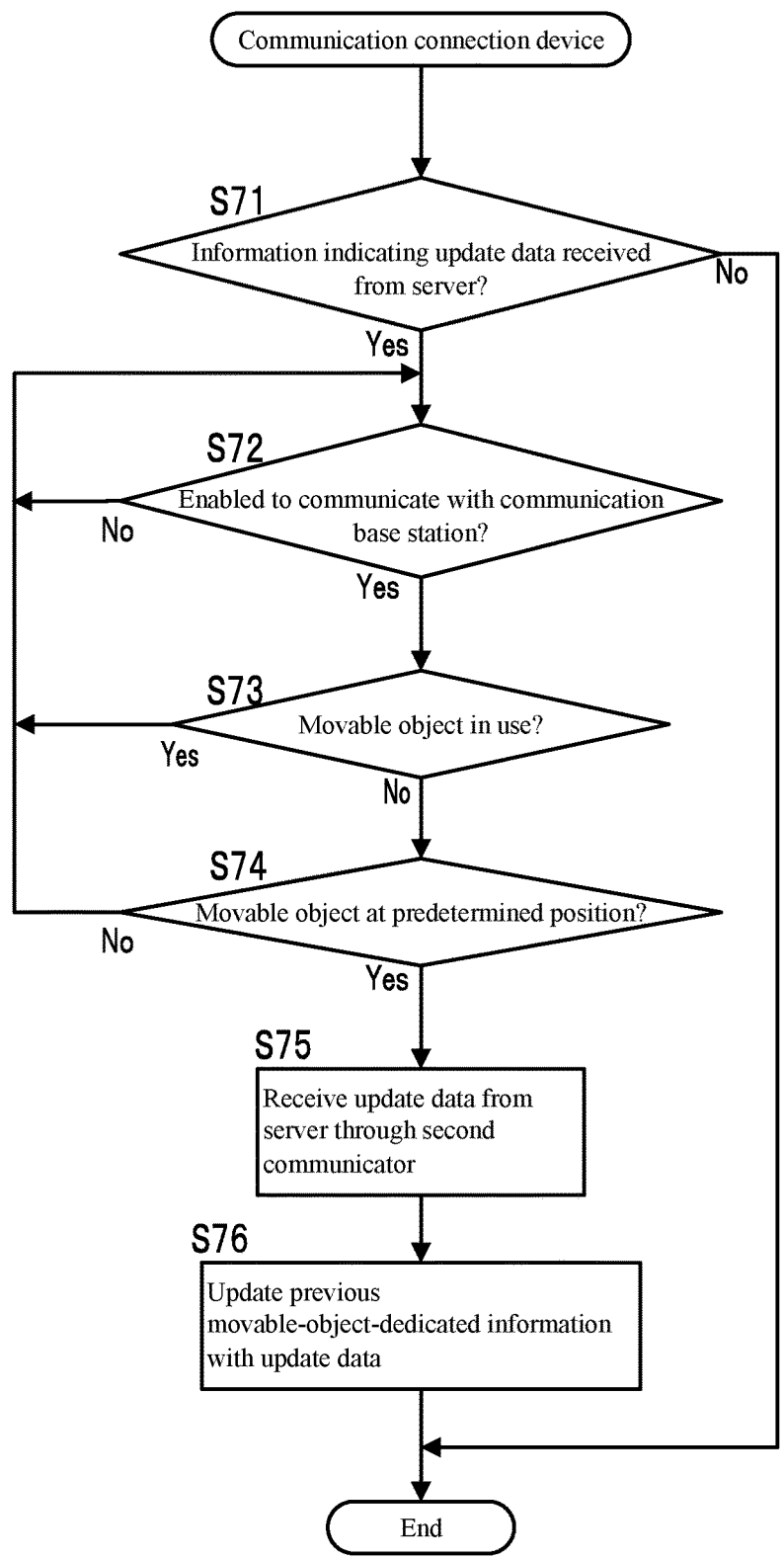
FIG. 10 is still another flowchart showing the processing performed by the communication connection device according to the present embodiment.

The operation of the communication connection device 8 in updating movable-object-dedicated information used in the movable object 6 will now be described with reference to the flowchart shown in FIG. 10.

The communication control unit 36a repeatedly determines, in predetermined cycles, whether information indicating the availability of update data for the movable-object-dedicated information for the movable object 6 has been received from the server 3 through the first communicator 32 (S71).

When receiving information indicating the availability of update data from the server 3 (Yes in S71), the communication control unit 36a determines whether the second communicator 33 is enabled to communicate with the communication base station 4 (S72).

When determining that the second communicator 33 is enabled to communicate with the communication base station 4 (Yes in S72), the communication control unit 36a determines whether the movable object 6 is in use with the use determination unit 36d in the device control unit 36 (S73).

When the use determination unit 36d determines that the movable object 6 is not in use (No in S73), the communication control unit 36a determines whether the movable object 6 is at the predetermined position based on obtained position information about the movable object 6 (S74). In the present embodiment, the predetermined position corresponds to the pit lane 5b. The determinations in S72 to S74 may be performed in a different order. Also, any one or two of the determinations in S72 to S74 may be eliminated in another embodiment.

When the second communicator 33 is enabled to communicate with the communication base station 4, and the use determination unit 36d determines that the movable object 6 is in use at the predetermined position, the communication control unit 36a receives update data from the server 3 through the second communicator 33 (S75). The communication control unit 36a receives the update data. The movable-object-dedicated information stored previously is then updated with the update data (S76).

When determining that the second communicator 33 is disabled to communicate with the communication base station 4 (No in S72), the communication control unit 36a receives no update data, and re-determines whether the second communicator 33 is enabled to communicate with the communication base station 4.

When the use determination unit 36d determines that the movable object 6 is in use (Yes in S73), the communication control unit 36a receives no update data but returns the processing to S72, and determines whether the second communicator 33 is enabled to communicate with the communication base station 4.

When determining that the movable object 6 is not at the predetermined position (No in S74), the communication control unit 36a receives no update data but returns the processing to S72, and determines whether the second communicator 33 is enabled to communicate with the communication base station 4.

The above steps (S72 to S74) cause the communication control unit 36a to receive update data for movable-object-dedicated information while the movable object 6 is not in use. This reduces the likelihood that the communication for receiving data is interrupted. Thus, the information transmission system 1 according to the present embodiment more reliably receives, from the server 3, movable-object-dedicated information with a large data size that is to be received without interruption. Also, the communication control unit 36a receives update data for movable-object-dedicated information while the movable object 6 is at the predetermined position. Thus, when the predetermined position is set at the pit lane 5b for example, the communication control unit 36a receives update data from the server 3 while the movable object 6 is stopped at the pit lane 5b.

The information transmission system 1 described above performs the above steps repeatedly to store movable object information obtained by the communication connection device 8 into the server 3. The information transmission system 1 stores the movable object information about the movable object 6 in the server 3, and can thus collect various items of information about the movable object 6. The collected movable object information may be used for maintaining the movable object 6 or managing client information about the user of the movable object 6. The movable object information transmitted from the movable object 6 to the server 3 includes position information about the movable object 6 transmitted at predetermined time intervals. Thus, the current position of the movable object 6 can be roughly determined by the server 3.

In the information transmission system 1, the movable-object-mounted device 2 communicates with the server 3 through short-range wireless communication to transmit specific movable object information and update data. The transmission is performed when the use determination unit 36d determines that the movable object 6 is not in use. In other words, the transmission is performed when the movable object 6 is stopped. Thus, the information transmission system 1 more reliably transmits specific movable object information from the movable-object-mounted device 2 to the server 3, and more reliably transmits update data from the server 3 to the movable-object-mounted device 2.

The information transmission system 1 uses, as appropriate, the first communicator 32 that has a limited number of times of transmission per day and a limited volume of transmission data at a time but consumes relatively low power, and the second communicator 33 that has no limited number of times of transmission and transmits a large volume of data at a time. Thus, the information transmission system 1 can transmit movable object information to the server 3 at predetermined time intervals while reducing the load on the communication network and reducing the communication cost. The second communicator 33 can transmit movable object information to the server 3 at predetermined time intervals up to about 140 times per day. In other words, the second communicator 33 transmits movable object information to the server 3 more promptly than the first communicator 32.

In the information transmission system 1, the communication connection device 8 is connected to the meter unit 7 with an in-vehicle LAN cable and an LVDS cable, and is installed separately from the meter unit 7. Thus, the communication connection device 8 is removed from the movable object 6 simply by unplugging the connectors of the in-vehicle LAN cable and the LVDS cable. The removed communication connection device 8 can be easily connected to the meter unit 7 in another movable object 6.

Figure 11:
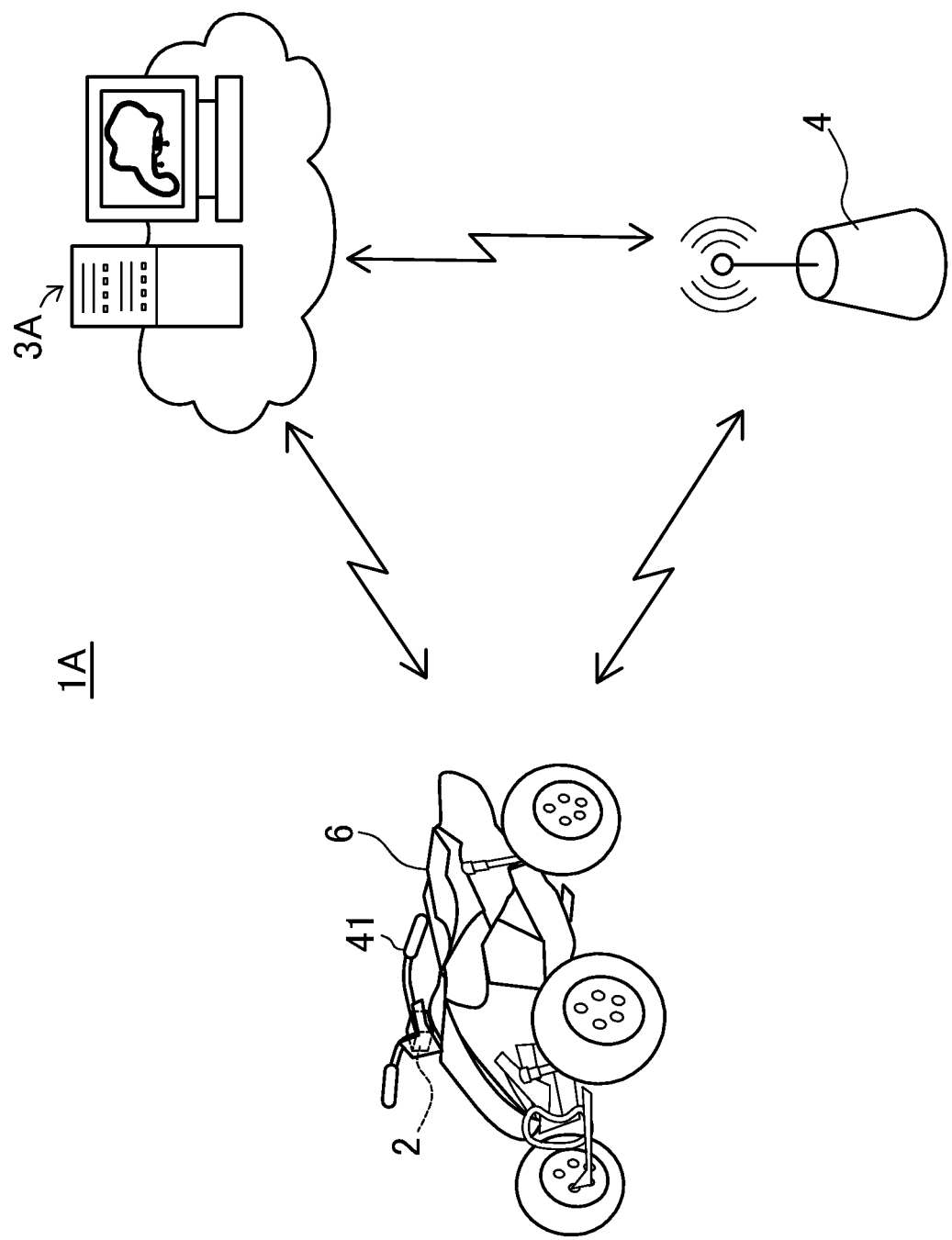
FIG. 11 is a schematic diagram of an information transmission system according to another embodiment.
Figure 12:
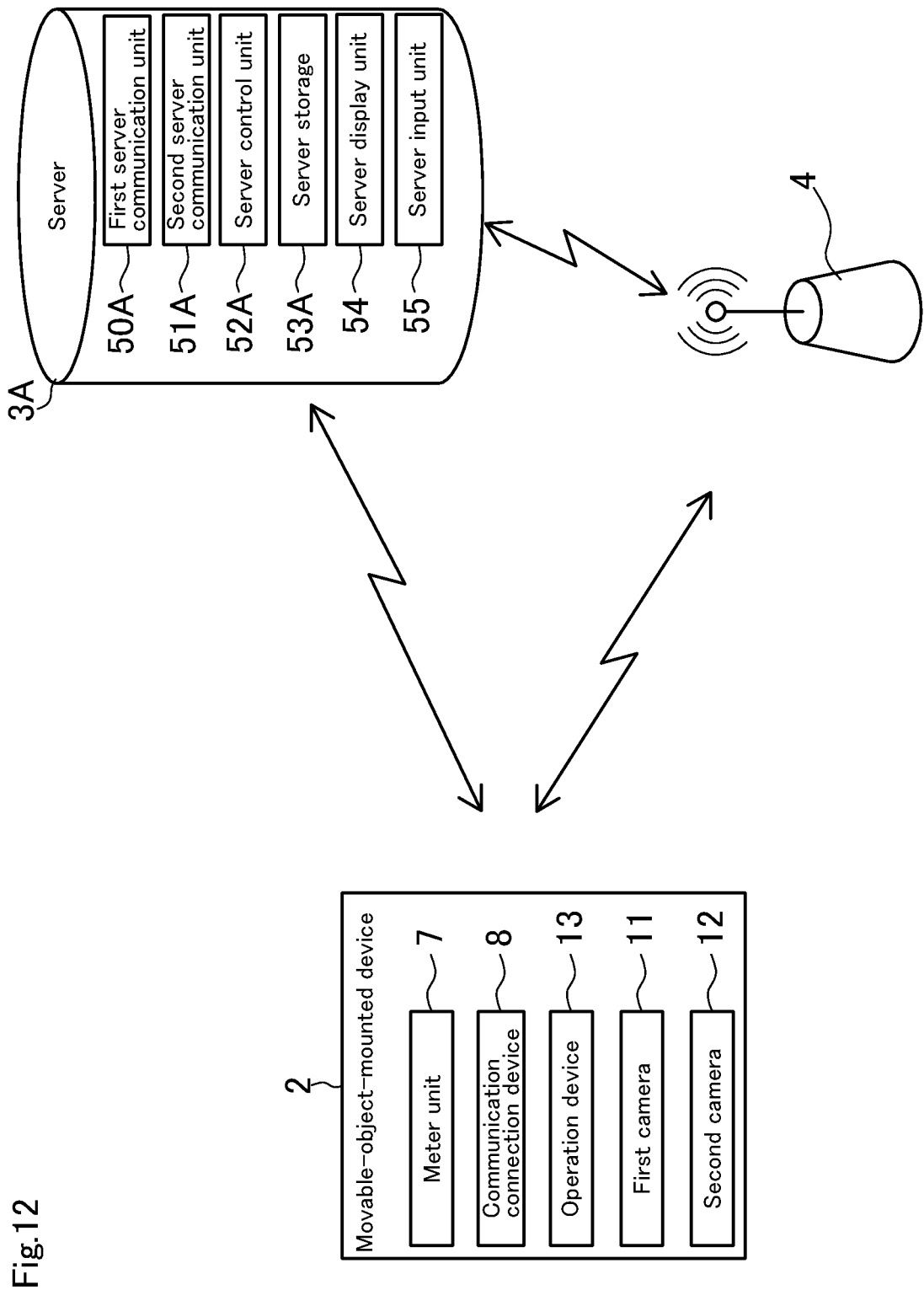
FIG. 12 is a schematic block diagram of a movable-object-mounted device, a server, and a communication base station according to the other embodiment.

Another embodiment will now be described. As shown in FIGS. 11 and 12, an information transmission system 1A according to the other embodiment includes a server 3A including components different from the server 3 in the embodiment described above. The components in the present embodiment that are the same as those of the information transmission system 1 in the above embodiment will not be described.

The information transmission system 1A according to the present embodiment includes a movable-object-mounted device 2, a server 3A, and a communication base station 4.

As shown in FIG. 12, the server 3A includes a first server communication unit 50A, a second server communication unit 51A, a server control unit 52A, a server storage 53A, a server display unit 54, and a server input unit 55.

The first server communication unit 50A communicates with the first communicator 32 in the communication connection device 8. The first server communication unit 50A communicates with the first communicator 32 through, for example, LPWA communication. LPWA communication between the first server communication unit 50A and the first communicator 32 is performed through a gateway for LPWA communication. In more detail, the first server communication unit 50A is connected to the gateway for LPWA communication with a computer network. The gateway for LPWA communication communicates with the first communicator 32 through LPWA communication. The first server communication unit 50A transmits an upload start instruction or a download start instruction to a movable object 6 selected in response to a predetermined operation on the server input unit 55 performed by a system user. The upload start instruction includes a data uploading request to the communication connection device 8 mounted on the movable object 6. The download start instruction includes a data downloading request to the communication connection device 8 mounted on the movable object 6. A communication device other than the server 3A may transmit the upload start instruction or the download start instruction to the first communicator 32 in the communication connection device 8.

The second server communication unit 51A communicates with the second communicator 33 in the communication connection device 8 via the communication base station 4. The second server communication unit 51A is connected to the communication base station 4 with a computer network. The communication base station 4 is connected to the second communicator 33 in the communication connection device 8 through short-range wireless communication.

The server control unit 52A may be a CPU. The server control unit 52A controls the server storage 53A to store movable object information received from the communication connection device 8 mounted on the movable object 6. For example, in response to a predetermined operation on the server input unit 55 performed by a system user, the server control unit 52A causes the first server communication unit 50A to transmit the upload start instruction or the download start instruction to the movable object 6 selected by the system user. When movable object information received from the communication connection device 8 mounted on the movable object 6 includes version information for movable-object-dedicated information used in the movable object 6, the server control unit 52A determines whether the version information is latest. When determining that the received version information for the movable-object-dedicated information is not latest, the server control unit 52A reads the latest movable-object-dedicated information from the server storage 53A and transmits the information to the communication connection device 8 when the second server communication unit 51A is connected to the second communicator 33 in the communication connection device 8 mounted on the movable object 6. Examples of the movable-object-dedicated information include image data to be displayed in the movable object 6 and programs for the movable object 6. When the movable object 6 provides its occupant with image data for AR or VR on a head mount display, the image data for the head mount display is also movable-object-dedicated information to be updated as appropriate.

Figure 13:
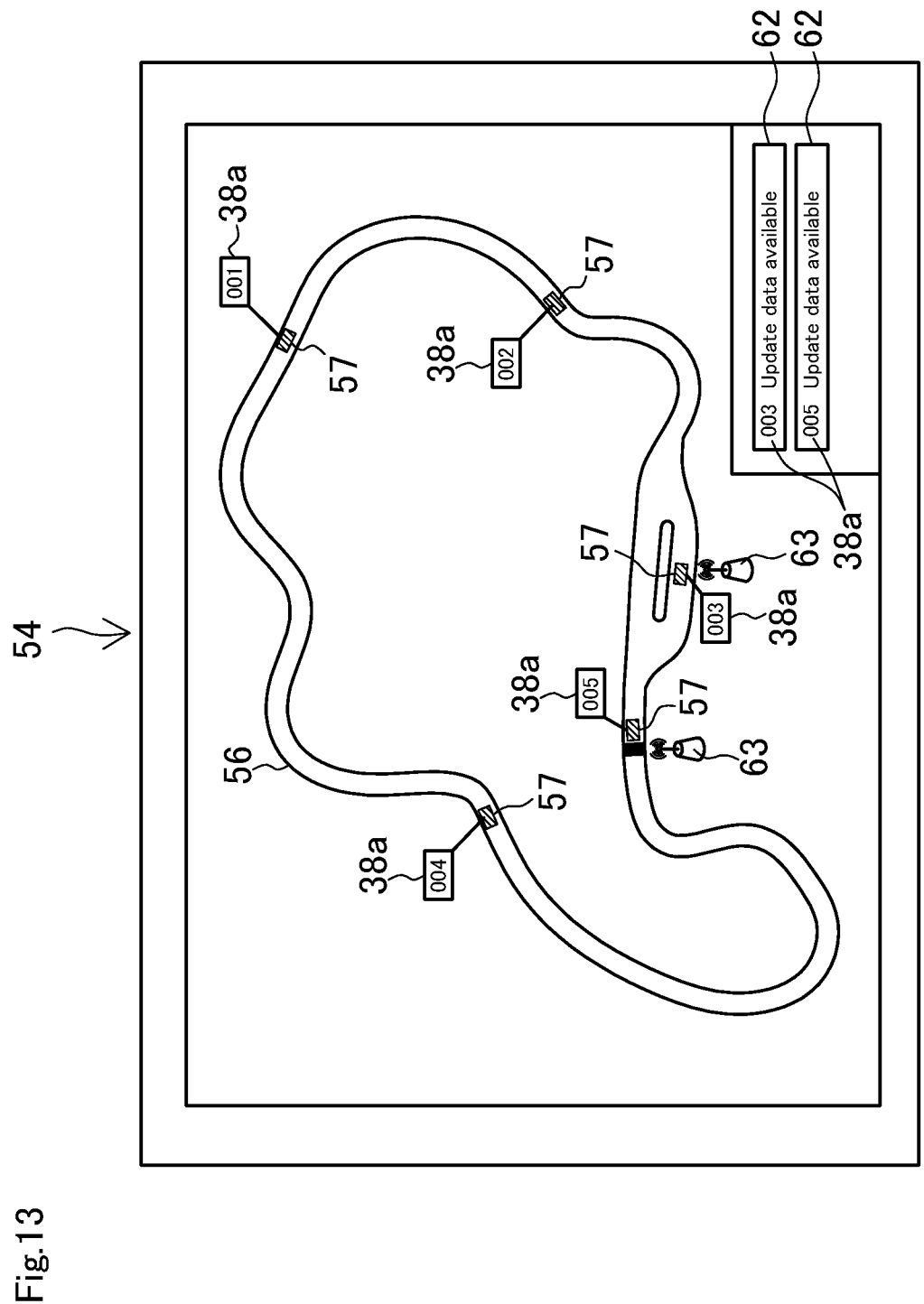
FIG. 13 is a diagram of an example screen displayed by a server display unit according to the other embodiment.

As shown in FIG. 13, the server control unit 52A causes the server display unit 54 to display a schematic diagram 56 indicating the circuit course 5 stored in the server storage 53A, movable object marks 57 indicating the positions of the movable objects 6, and communication base station marks 63 indicating the positions of the communication base stations 4. The server control unit 52A causes each movable object mark 57 to be displayed in correspondence with unique identification information 38a. The server control unit 52A calculates the position of each movable object mark 57 in the schematic diagram 56 of the circuit course 5 based on the latest position information received from the communication connection device 8 mounted on each movable object 6. The server control unit 52A causes the movable object mark 57 to be displayed at the calculated position in the schematic diagram 56. In other words, the server control unit 52A changes the position of the movable object mark 57 in the schematic diagram 56 indicating the circuit course 5 based on the latest position information received from the movable object 6.

The server storage 53A may be a non-volatile memory. The server storage 53A stores movable object information received from the communication connection device 8. The server storage 53A stores movable-object-dedicated information for updating. Hereafter, the movable-object-dedicated information for updating is also referred to as update data. When including multiple movable objects 6, the information transmission system 1A according to the present embodiment causes the server storage 53A to store brief log information 40a and detailed log information 40b each corresponding to unique identification information 38a received from the communication connection device 8 mounted on each movable object 6.

The server display unit 54 may be a liquid crystal monitor device. The server display unit 54 outputs image data received from the server control unit 52A. Examples of the server input unit 55 include a mouse and a keyboard.

An information transmission method implemented with the information transmission system 1A according to the present embodiment will now be described with reference to the flowcharts shown in FIGS. 14 to 16. The information transmission method according to the present embodiment includes steps from obtaining movable object information about the movable object 6 with the communication connection device 8 to transmitting the information from the communication connection device 8 to the server 3A.

Figure 14:
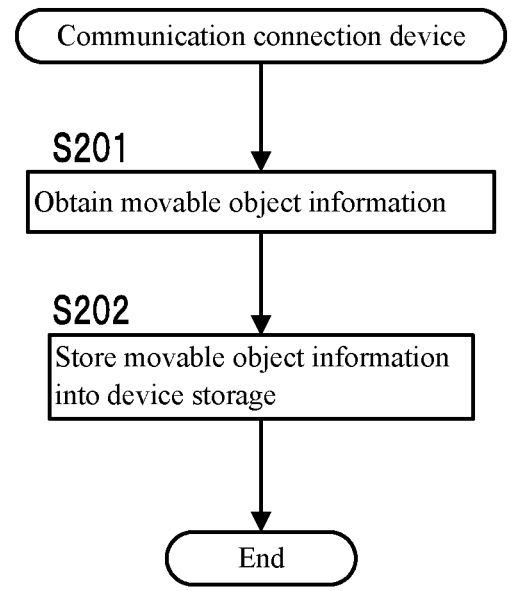
FIG. 14 is a flowchart showing the processing performed by a communication connection device according to the other embodiment.

As shown in FIG. 14, the information obtaining unit 36f first obtains movable object information (S201). Examples of movable object information to be obtained include the position information about the movable object 6, the cumulative travel distance 28a, the unique identification information 38a, the version information for movable-object-dedicated information, the brief log information 40a, and the detailed log information 40b.

The communication control unit 36a temporarily stores the movable object information obtained by the information obtaining unit 36f into the device storage 38 (S202).

Figure 15:
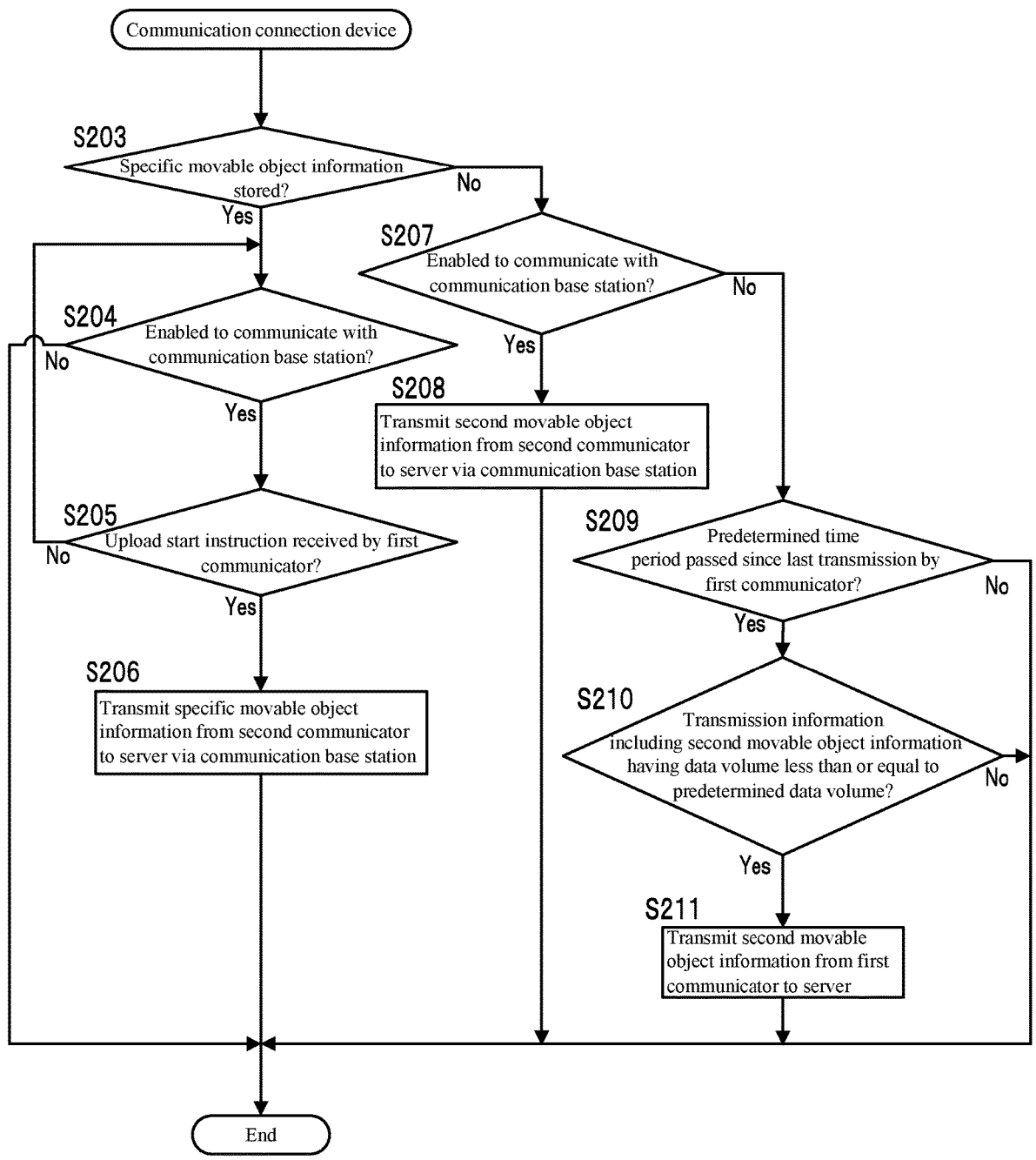
FIG. 15 is another flowchart showing the processing performed by the communication connection device according to the other embodiment.

As shown in FIG. 15, the communication control unit 36a repeatedly determines whether the device storage 38 stores specific movable object information at predetermined time intervals (S203). Hereafter, specific movable object information is also referred to as first movable object information.

When the device storage 38 stores specific movable object information (Yes in S203), the communication control unit 36a determines whether the second communicator 33 is enabled to communicate with the communication base station 4 (S204).

When determining that the second communicator 33 is enabled to communicate with the communication base station 4 (Yes in S204), the communication control unit 36a determines whether the upload start instruction has been received through the first communicator 32 (S205). The upload start instruction is immediately transmitted to the movable object 6 in response to, for example, a predetermined operation on the server input unit 55 in the server 3A performed by the system user. In the present embodiment, the system user is a manager of the circuit course. The upload start instruction includes an instruction for transmitting specific movable object information to the server 3A. The specific movable object information may be, for example, data with a data size too large to transmit at a time by the first communicator 32. Examples of such data with a data size too large to transmit at a time include image data and detailed log information 40b.

When determining that the second communicator 33 is disabled to communicate with the communication base station 4 (No in S204), the communication control unit 36a ends the processing.

When determining that the upload start instruction has yet to be received through the first communicator 32 (No in S205), the communication control unit 36a returns the processing to S204. More specifically, the communication control unit 36a repeatedly determines whether the upload start instruction has been received through the first communicator 32 while the second communicator 33 is enabled to communicate with the communication base station 4.

When determining that the upload start instruction has been received (Yes in S205), the communication control unit 36a causes the second communicator 33 to transmit specific transmission information including specific movable object information to the server 3A via the communication base station 4 (S206).

When the device storage 38 stores movable object information different from specific movable object information (No in S203), the communication control unit 36a determines whether the second communicator 33 is enabled to communicate with the communication base station 4 (S207).

Hereafter, movable object information different from specific movable object information is also referred to as second movable object information.

When determining that the second communicator 33 is enabled to communicate with the communication base station 4 (Yes in S207), the communication control unit 36a causes the second communicator 33 to transmit transmission information including second movable object information to the server 3A via the communication base station 4 (S208).

When determining that the second communicator 33 is disabled to communicate with the communication base station 4 (No in S207), the communication control unit 36a determines whether the predetermined time period has passed since the last transmission of movable object information by the first communicator 32 (S209). This determination enables the first communicator 32 to transmit information at predetermined time intervals.

When determining that the predetermined time period has passed since the last transmission of movable object information by the first communicator 32 (Yes in S209), the communication control unit 36a determines whether the data volume of transmission information including second movable object information is less than or equal to the predetermined data volume (S210).

When determining that the data volume of transmission information including second movable object information is less than or equal to the predetermined data volume (Yes in S210), the communication control unit 36a causes the first communicator 32 to transmit the transmission information including the second movable object information to the server 3A (S211).

When determining that the predetermined time period has yet to pass since the last transmission of movable object information by the first communicator 32 (No in S209), the communication control unit 36a ends the processing.

When determining that the data volume of transmission information including second movable object information exceeds the predetermined data volume (No in S210), the communication control unit 36a ends the processing.

The communication control unit 36a repeats the above steps to cause the second communicator 33 to transmit specific movable object information to the server 3A, and the first communicator 32 or the second communicator 33 to transmit second movable object information to the server 3A.

Figure 16:
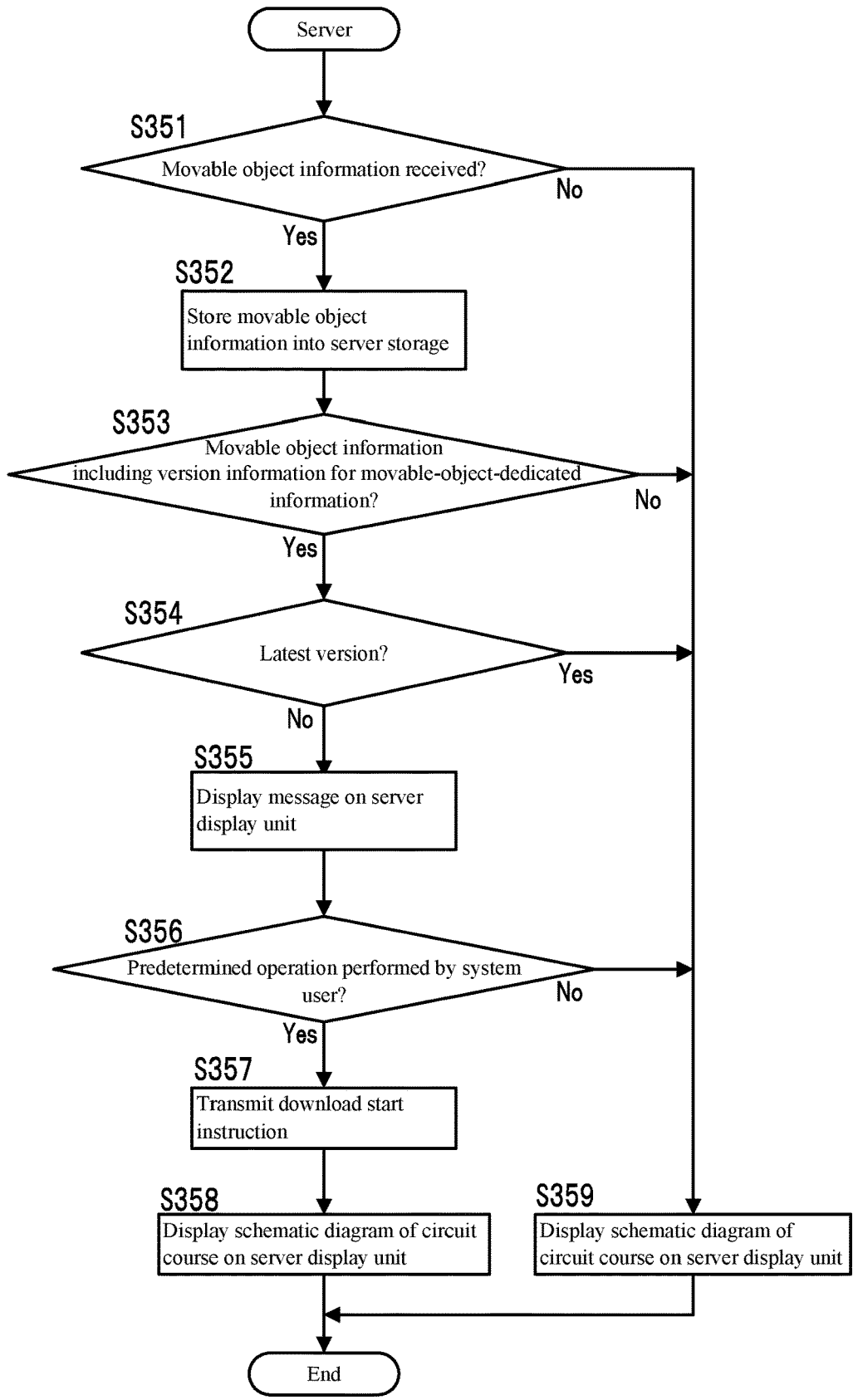
FIG. 16 is a flowchart showing the processing performed by the server according to the other embodiment.

In the server 3A, as shown in FIG. 16, the server control unit 52A receives movable object information from the communication connection device 8 through the first server communication unit 50A or the second server communication unit 51A (S151), and stores the received movable object information into the server storage 53A (S152).

The server control unit 52A determines whether the received movable object information includes version information for movable-object-dedicated information (S353).

When determining that the received movable object information includes version information for movable-object-dedicated information (Yes in S353), the server control unit 52A determines whether the version information for the movable-object-dedicated information is latest (S354).

Figure 17:
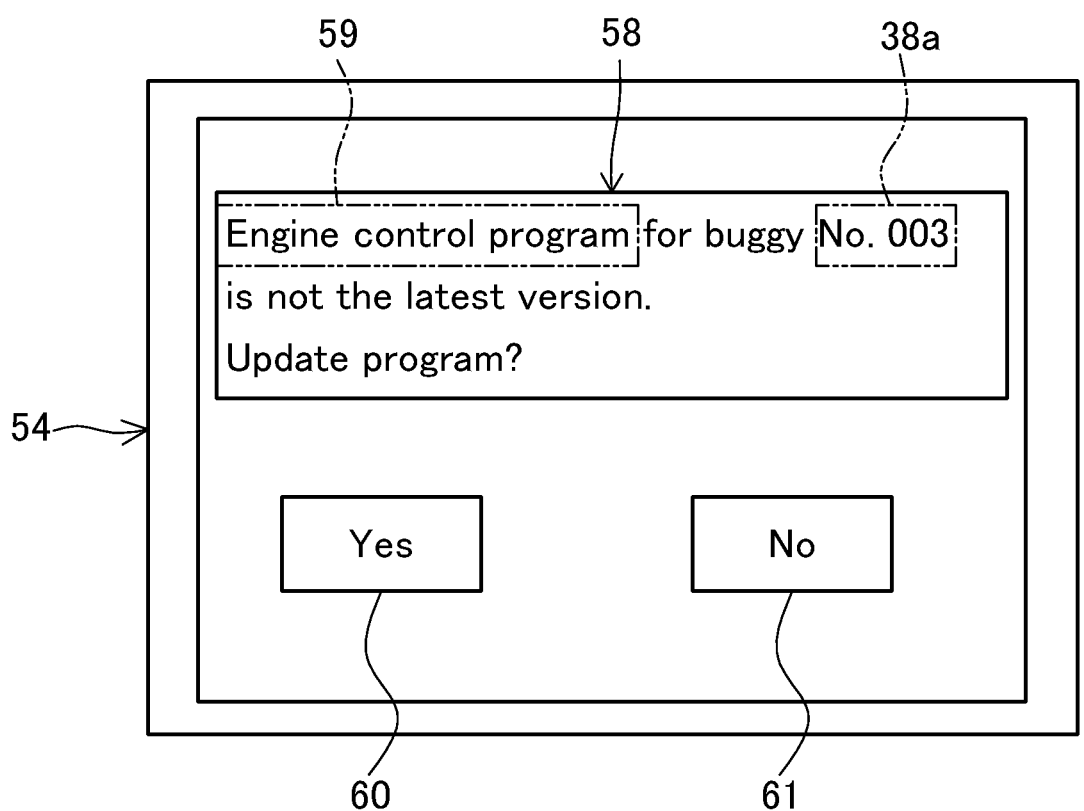
FIG. 17 is a diagram of another example screen displayed by the server display unit according to the other embodiment.

When determining that the version information for the movable-object-dedicated information is not latest (No in S354), the server control unit 52A causes the server display unit 54 to display determination information indicating that the version information for the movable-object-dedicated information is not latest, and identification information about the movable object 6 having the version information that is not latest for the movable-object-dedicated information. For example, as shown in FIG. 17, the server control unit 52A causes the server display unit 54 to display a message 58 indicating that the movable-object-dedicated information is not latest (S355). The message 58 may specifically include unique identification information 38a about the movable object 6, and the type 59 of the movable-object-dedicated information.

In response to a predetermined operation on the server input unit 55 performed by the system user (a manager of the circuit course in the present embodiment) for updating movable-object-dedicated information for the movable object 6 (Yes in S356), the server control unit 52A causes the first server communication unit 50A to transmit the download start instruction to the communication connection device 8 mounted on the movable object 6 (S357). For example, the system user presses a first button 60 shown in FIG. 17 as a predetermined operation on the server input unit 55 for updating movable-object-dedicated information for the movable object 6. In FIG. 17, the server display unit 54 displays the first button 60 with the message 58.

After transmission of the download start instruction, the server control unit 52A causes the server display unit 54 to re-display the schematic diagram 56 of the circuit course 5 shown in FIG. 13 (S358).

In response to a predetermined operation by the system user for avoiding an update of movable-object-dedicated information for the movable object 6 (No in S356), the server control unit 52A causes no transmission of download start instruction, and causes the server display unit 54 to re-display the schematic diagram 56 of the circuit course 5 in FIG. 13 (S359). In this case, as shown in FIG. 13, the server control unit 52A causes alert information 62 for alerting the user to be displayed on the same display together with the schematic diagram 56 of the circuit course. The alert information 62 includes information indicating stored update data, and unique identification information 38a about the movable object 6 to be a data update target. For example, the system user presses a second button 61 shown in FIG. 17 as a predetermined operation on the server input unit 55 for avoiding an update of movable-object-dedicated information for the movable object 6. The server display unit 54 may display the second button 61 with the message 58.

Figure 18:
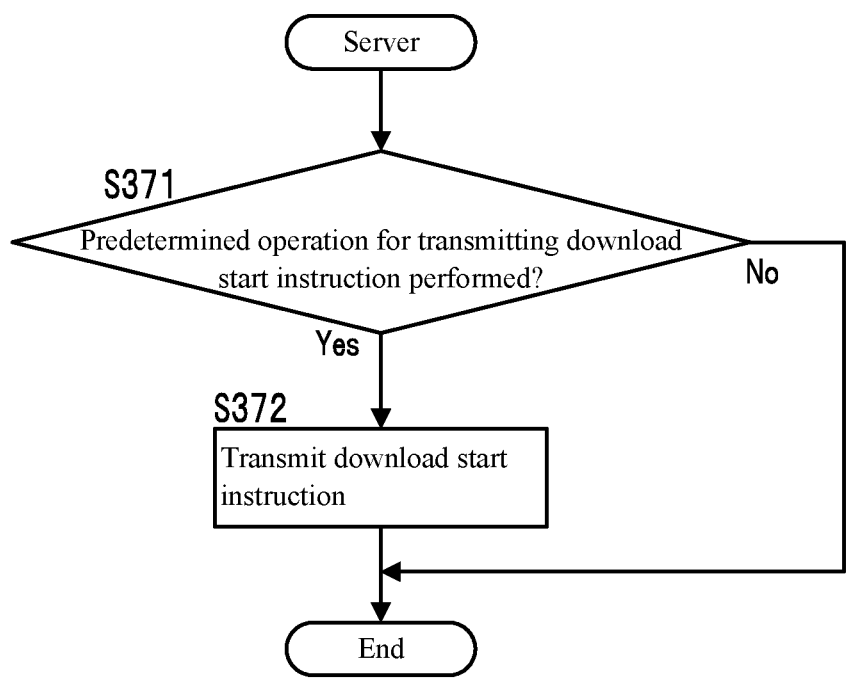
FIG. 18 is another flowchart showing the processing performed by the server according to the other embodiment.

After the predetermined operation for avoiding an update of movable-object-dedicated information for the movable object 6 (No in S356) to transmit no download start instruction, the system user can perform a predetermined operation causing the transmission of the download start instruction on the server input unit 55 as shown in FIG. 18 (Yes in S371) to transmit the download start instruction to the communication connection device 8 mounted on the movable object 6 (S372). For example, the system user selects the alert information 62 displayed on the server display unit 54 (shown in FIG. 13) through the server input unit 55 as the predetermined operation for transmitting the download start instruction.

Figure 19:
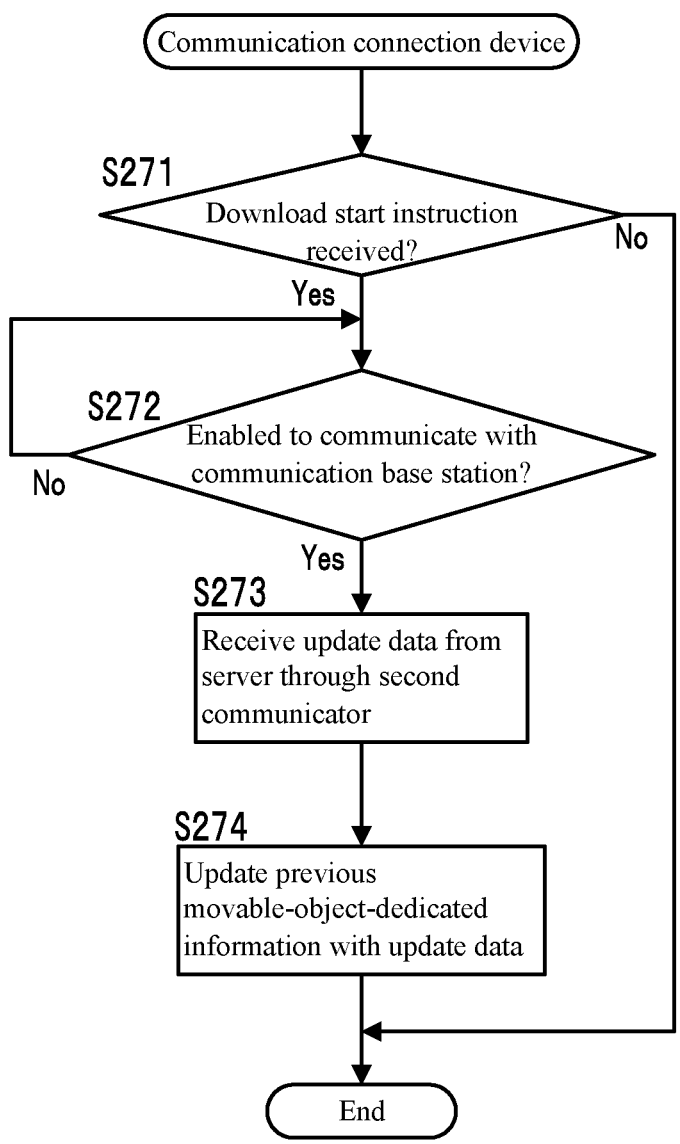
FIG. 19 is still another flowchart showing the processing performed by the communication connection device according to the other embodiment.

The operation for updating movable-object-dedicated information used in the movable object 6 will now be described with reference to the flowchart shown in FIG. 19.

The communication control unit 36a repeatedly determines whether the download start instruction has been received from the server 3A through the first communicator 32 in predetermined cycles (S271).

When receiving the download start instruction from the server 3A (Yes in S271), the communication control unit 36a determines whether the second communicator 33 is enabled to communicate with the communication base station 4 (S272).

When determining that the second communicator 33 is enabled to communicate with the communication base station 4 (Yes in S272), the communication control unit 36a receives update data for movable-object-dedicated information from the server 3A through the second communicator 33 (S273). The communication control unit 36a receives update data for movable-object-dedicated information. The movable-object-dedicated information as an update target is then updated with the update data (S274). The communication control unit 36a receives update data for movable-object-dedicated information from the server 3A independently of S206, S208, or S211 in which the communication control unit 36a transmits movable object information to the server 3A. In other words, the timing for data reception and the timing for information transmission may be in any order.

When determining that the second communicator 33 is disabled to communicate with the communication base station 4 (No in S272), the communication control unit 36a receives no update data for movable-object-dedicated information but re-determines whether the second communicator 33 is enabled to communicate with the communication base station 4. When determining that the second communicator 33 is enabled to communicate with the communication base station 4, the communication control unit 36a receives update data for movable-object-dedicated information from the server 3A through the second communicator 33 (S273). The communication control unit 36a receives update data. The movable-object-dedicated information as an update target is then updated with the update data (S274).

The information transmission system 1A described above enables the system user to transmit the upload or download start instruction to the movable object 6 by performing the predetermined operation at the server 3A. The upload start instruction is transmitted to a movable object 6 near the communication base station 4 to cause the movable object 6 to transmit specific movable object information to the server 3A immediately. Also, the download start instruction is transmitted to a movable object 6 near the communication base station 4 to cause the communication connection device 8 mounted on the movable object 6 to download update data immediately. As shown in FIG. 13, the movable objects 6 near the communication base stations 4 are easily located with the movable object marks 57 and the communication base station marks 63 displayed on the schematic diagram 56 of the circuit course.

The information transmission system 1A according to the present embodiment allows the system user to transmit specific movable object information from the movable object 6 to the server 3A at an intended timing. Also, the system user can cause the communication connection device 8 mounted on the movable object 6 to download update data at an intended timing.

The information transmission system 1A stores movable object information obtained by the communication connection device 8 into the server 3A. The information transmission system 1A stores the movable object information about the movable object 6 in the server 3A, and can thus collect various items of information about the movable object 6. The collected movable object information may be used for maintaining the movable object 6 or managing client information about the user of the movable object 6.

The information transmission system 1A uses, as appropriate, the first communicator 32 that has a limited number of times of transmission per day and a limited volume of transmission data at a time but consumes relatively low power, and the second communicator 33 that has no limited number of times of transmission and transmits a large volume of data at a time. Thus, the information transmission system 1 can transmit movable object information to the server 3A at predetermined time intervals while reducing the load on the communication network and reducing the communication cost. The second communicator 33 can transmit movable object information to the server 3A at predetermined time intervals up to about 140 times per day. In other words, the second communicator 33 transmits movable object information to the server 3A more promptly than the first communicator 32.

In the information transmission system 1A, the communication connection device 8 is connected to the meter unit 7 with an in-vehicle LAN cable and an LVDS cable, and is installed separately from the meter unit 7. Thus, the communication connection device 8 is removed from the movable object 6 simply by unplugging the connectors of the in-vehicle LAN cable and the LVDS cable. The removed communication connection device 8 can be easily connected to the meter unit 7 in another movable object 6.

The embodiments described above are merely illustrative in all respects and should not be construed to be restrictive. The present invention may be embodied in various other forms without departing from the spirit or the main features of the present invention.

REFERENCE SIGNS LIST 1, 1A information transmission system
2 movable-object-mounted device
3, 3A server
4 communication base station
5 circuit course
5a start and goal position
5b pit lane
6 movable object
8 communication connection device
32 first communicator
33 second communicator
34 position obtaining unit
36a communication control unit
36c stop duration obtaining unit
36d use determination unit
36f information obtaining unit
38b device control program
50, 50A first server communication unit
52, 52A server control unit
54 server display unit
55 server input unit
56 schematic diagram
57 movable object mark
63 communication base station mark

The invention claimed is:

1. An information transmission system, comprising:
a communication connection device mountable on a movable object; and
a server configured to perform information transmission with the communication connection device,
the communication connection device including
an information obtaining unit configured to obtain movable object information about the movable object,
a use determination unit configured to determine whether the movable object is in use,
a first communicator configured to communicate with the server,
a second communicator configured to communicate with the server via a communication base station through short-range wireless communication, and
a communication control unit configured to control the first communicator and the second communicator,
wherein the first communicator transmits transmission information including the movable object information to the server,
the second communicator transmits the transmission information including the movable object information to the server via the communication base station,
the second communicator communicates with the server for a larger volume of data than the first communicator at a time, or communicates with the server more frequently than the first communicator,
the communication control unit causes the second communicator to transmit, selectively from the transmission information, specific transmission information including predefined movable object information to the server when the use determination unit determines that the movable object is not in use and when the second communicator is enabled to communicate with the communication base station, and
the communication control unit causes the first communicator or the second communicator to transmit, selectively from the transmission information, transmission information different from the specific transmission information to the server.

2. The information transmission system according to claim 1, wherein
the movable object information obtained by the information obtaining unit includes position information about the movable object, and
the communication control unit causes the second communicator to transmit, selectively from the transmission information, the specific transmission information to the server when the use determination unit determines that the movable object is not in use while the movable object is at a predetermined position and when the second communicator is enabled to communicate with the communication base station.

3. The information transmission system according to claim 1, wherein
the communication control unit receives movable-object-dedicated information used in the movable object from the server through the second communicator when the use determination unit determines that the movable object is not in use and when the second communicator is enabled to communicate with the communication base station.

4. The information transmission system according to claim 1, wherein
the communication control unit causes the first communicator to transmit the transmission information different from the specific transmission information to the server when the second communicator is disabled to communicate with the communication base station, and causes the second communicator to transmit the transmission information different from the specific transmission information to the server when the second communicator is enabled to communicate with the communication base station.

5. The information transmission system according to claim 1, further comprising:
a stop duration obtaining unit configured to obtain a stop duration for the movable object,
wherein the use determination unit determines that the movable object is not in use when the stop duration has reached a predetermined duration.

6. The information transmission system according to claim 5, wherein
the stop duration obtaining unit obtains a duration for which an ignition power source of the movable object is off as a stop duration for the movable object, and
the use determination unit determines that the movable object is not in use when the duration for which the ignition power source is off has reached the predetermined duration.

7. The information transmission system according to claim 1, wherein
the use determination unit determines that the movable object is not in use when an ignition power source is off and an accessory power source is on.

8. An information transmission system, comprising:
a communication connection device mountable on a movable object; and
a server configured to perform information transmission with the communication connection device,
the communication connection device including
an information obtaining unit configured to obtain movable object information about the movable object,
a first communicator configured to communicate with the server,
a second communicator configured to communicate with the server via a communication base station through short-range wireless communication, and
a communication control unit configured to control the first communicator and the second communicator,
wherein the first communicator transmits transmission information including the movable object information to the server,
the second communicator transmits the transmission information including the movable object information to the server via the communication base station,
the second communicator communicates with the server for a larger volume of data than the first communicator at a time, or communicates with the server more frequently than the first communicator,
the communication control unit causes the second communicator to transmit, selectively from the transmission information, specific transmission information including predefined movable object information to the server when the second communicator is enabled to communicate with the communication base station and when the first communicator has received an upload start instruction, and
the communication control unit causes the first communicator or the second communicator to transmit, selectively from the transmission information, transmission information different from the specific transmission information to the server.

9. The information transmission system according to claim 8, wherein
the server includes
a first server communication unit configured to communicate with the first communicator,
a server input unit configured to receive a predetermined operation, and
a server control unit configured to cause the first server communication unit to transmit the upload start instruction to the first communicator when the server input unit receives the predetermined operation.

10. The information transmission system according to claim 9, wherein
the movable object information includes position information about the movable object,
the server includes a server display unit,
the server control unit causes the server display unit to display a schematic diagram of a predetermined area in which the movable object is movable, a movable object mark indicating a position of the movable object in the schematic diagram, and a communication base station mark indicating a position of the communication base station in the schematic diagram, and
the server control unit causes the movable object mark in the schematic diagram to be displayed based on the position information received from the movable object.

11. An information transmission system, comprising:
a communication connection device mountable on a movable object; and
a server configured to perform information transmission with the communication connection device,
the communication connection device including
an information obtaining unit configured to obtain movable object information about the movable object,
a first communicator configured to communicate with the server,
a second communicator configured to communicate with the server via a communication base station through short-range wireless communication, and
a communication control unit configured to control the first communicator and the second communicator,
wherein the first communicator transmits transmission information including the movable object information to the server,
the second communicator transmits the transmission information including the movable object information to the server via the communication base station, or receives movable-object-dedicated information used in the movable object from the server via the communication base station,
the second communicator communicates with the server for a larger volume of data than the first communicator at a time, or communicates with the server more frequently than the first communicator,
the communication control unit causes the second communicator to receive the movable-object-dedicated information from the server when the second communicator is enabled to communicate with the communication base station and when the first communicator has received a download start instruction, and
the communication control unit causes the first communicator or the second communicator to transmit the transmission information to the server.

12. The information transmission system according to claim 11, wherein
the server includes
a first server communication unit configured to communicate with the first communicator,
a server input unit configured to receive a predetermined operation, and
a server control unit configured to cause the first server communication unit to transmit the download start instruction to the first communicator when the server input unit receives the predetermined operation.

13. The information transmission system according to claim 12, wherein
the movable object information includes position information about the movable object,
the server includes a server display unit,
the server control unit causes the server display unit to display a schematic diagram of a predetermined area in which the movable object is movable, a movable object mark indicating a position of the movable object in the schematic diagram, and a communication base station mark indicating a position of the communication base station in the schematic diagram, and the server control unit causes the movable object mark in the schematic diagram to be displayed based on the position information received from the movable object.

14. The information transmission system according to claim 12, wherein the server includes a server display unit, the server control unit determines, when the received movable object information includes version information for the movable-object-dedicated information, whether the version information is latest, and the server control unit causes, when determining that the version information is not latest, the server display unit to display identification information of the movable object and determination information indicating that the version information is not latest.

* * * * *